United States Patent
Tweet et al.

(10) Patent No.: US 7,044,526 B2
(45) Date of Patent: May 16, 2006

(54) MATING RECEIVER RACK FOR PERSONAL RECREATIONAL VEHICLES

(75) Inventors: Ole E. Tweet, Thief River Falls, MN (US); Kenneth Q. Kalsnes, Thief River Falls, MN (US); P. Lewis Vaughn, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 115 days.

(21) Appl. No.: 10/172,531

(22) Filed: Jun. 13, 2002

(65) Prior Publication Data

US 2003/0230607 A1  Dec. 18, 2003

(51) Int. Cl.
*B60R 9/00* (2006.01)

(52) U.S. Cl. .......................... 296/3; 296/37.1; 224/401; 224/485

(58) Field of Classification Search .................... 296/3, 296/37.1; 224/401, 485, 524, 42.32, 564, 224/547

See application file for complete search history.

(56) References Cited

U.S. PATENT DOCUMENTS

| | | | | |
|---|---|---|---|---|
| 4,614,252 A | * | 9/1986 | Tarner | 182/116 |
| 5,662,451 A | * | 9/1997 | Muzzi et al. | 414/540 |
| 5,876,147 A | * | 3/1999 | Longo | 403/109.5 |
| 6,461,095 B1 | * | 10/2002 | Puska | 414/462 |
| 6,502,728 B1 | * | 1/2003 | Savant | 224/401 |
| 6,626,748 B1 | * | 9/2003 | Homer, Sr. | 452/189 |
| 6,793,108 B1 | * | 9/2004 | Williams, Jr. | 224/401 |

* cited by examiner

*Primary Examiner*—Joseph D. Pape
(74) *Attorney, Agent, or Firm*—Black Lowe & Graham PLLC; Darren J. Jones

(57) ABSTRACT

A sectional receiver rack includes a main framework piece that is attached to a mounting surface of the personal recreational vehicle. The main framework may be flat and may be fashioned generally in the image of a cargo rack. The main framework may have mounting flanges for facilitating its connection to the recreational vehicle. The main framework has couplers along one or more portions of its periphery. The couplers enable the main framework to be joined to one or more auxilliary frame pieces that contain coupling members that mate with the couplers of the main framework. The auxilliary frame pieces may be removed, thereby exposing the couplers to which they were attached. The exposed couplers may be used for joining cargo unit to the main framework. Accordingly, the cargo units may be secured to the main framework by joining their attached coupling members to the couplers attached to the main framework.

26 Claims, 30 Drawing Sheets

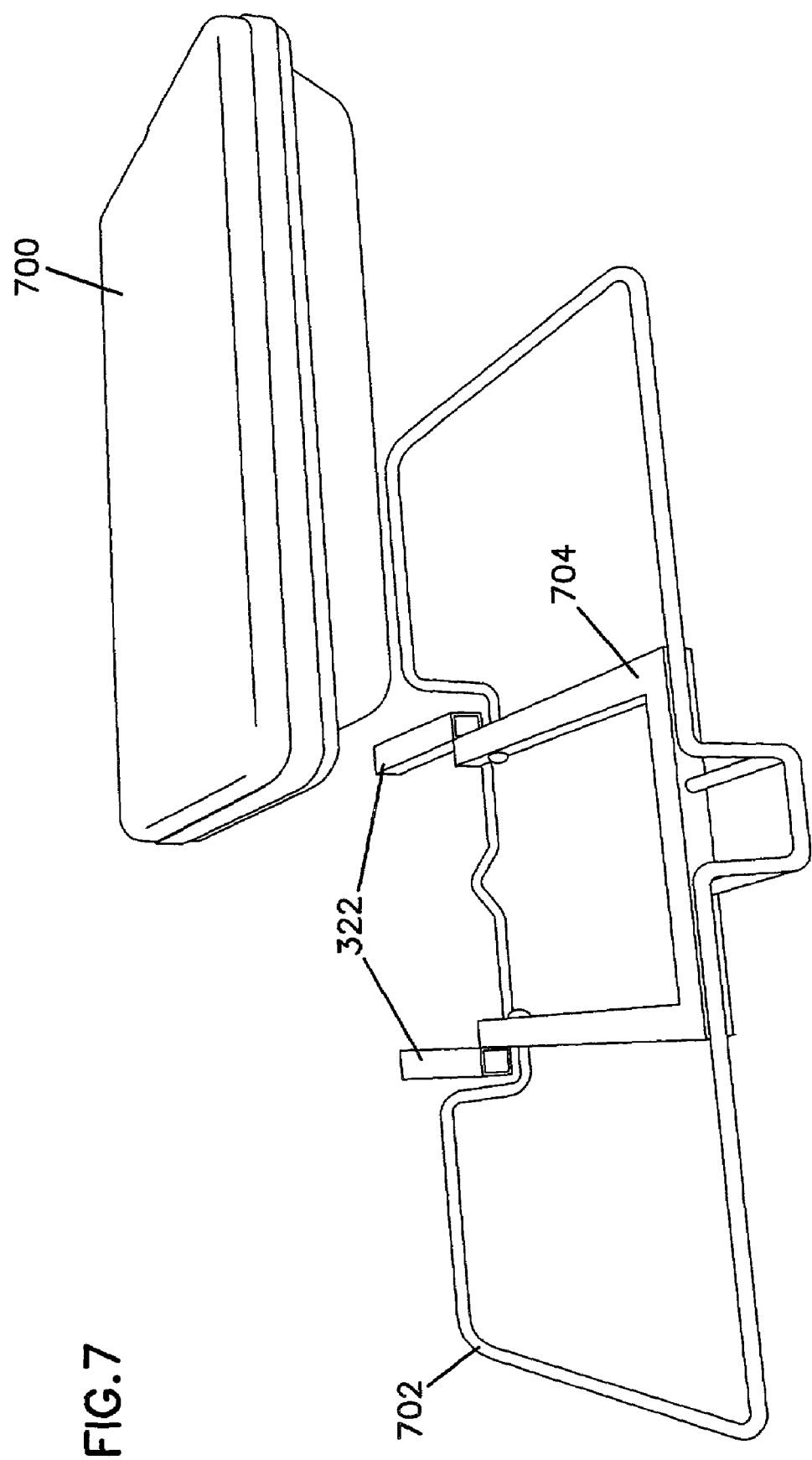

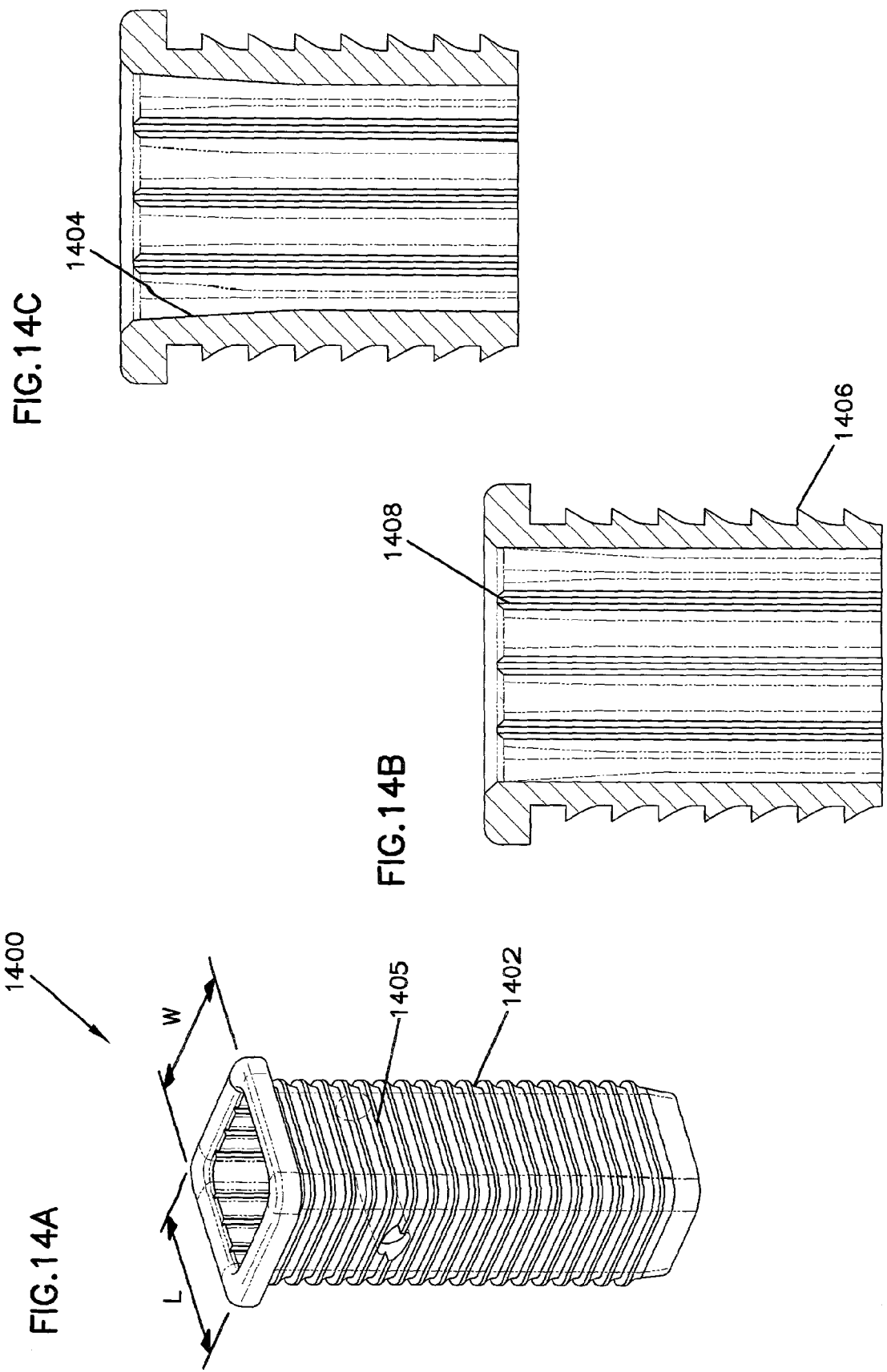

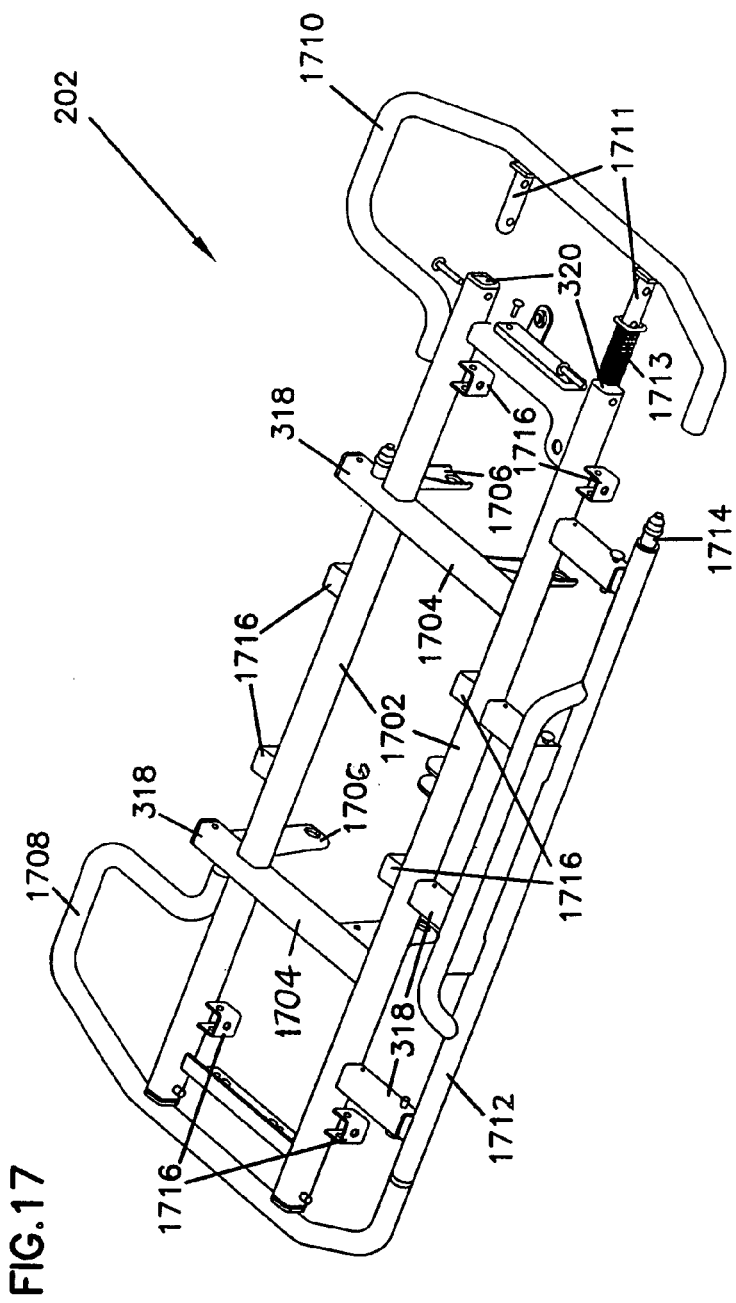
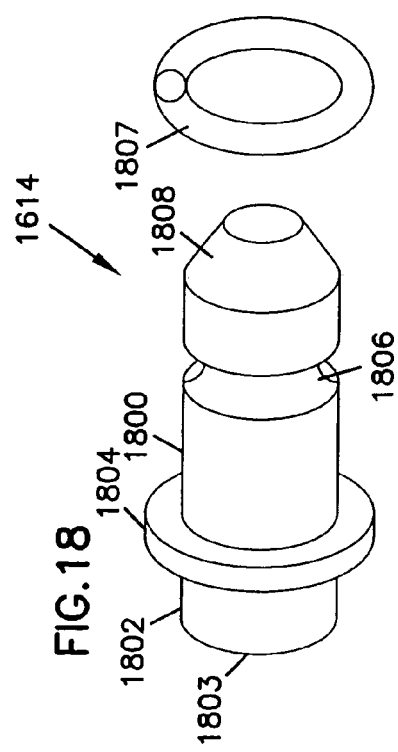

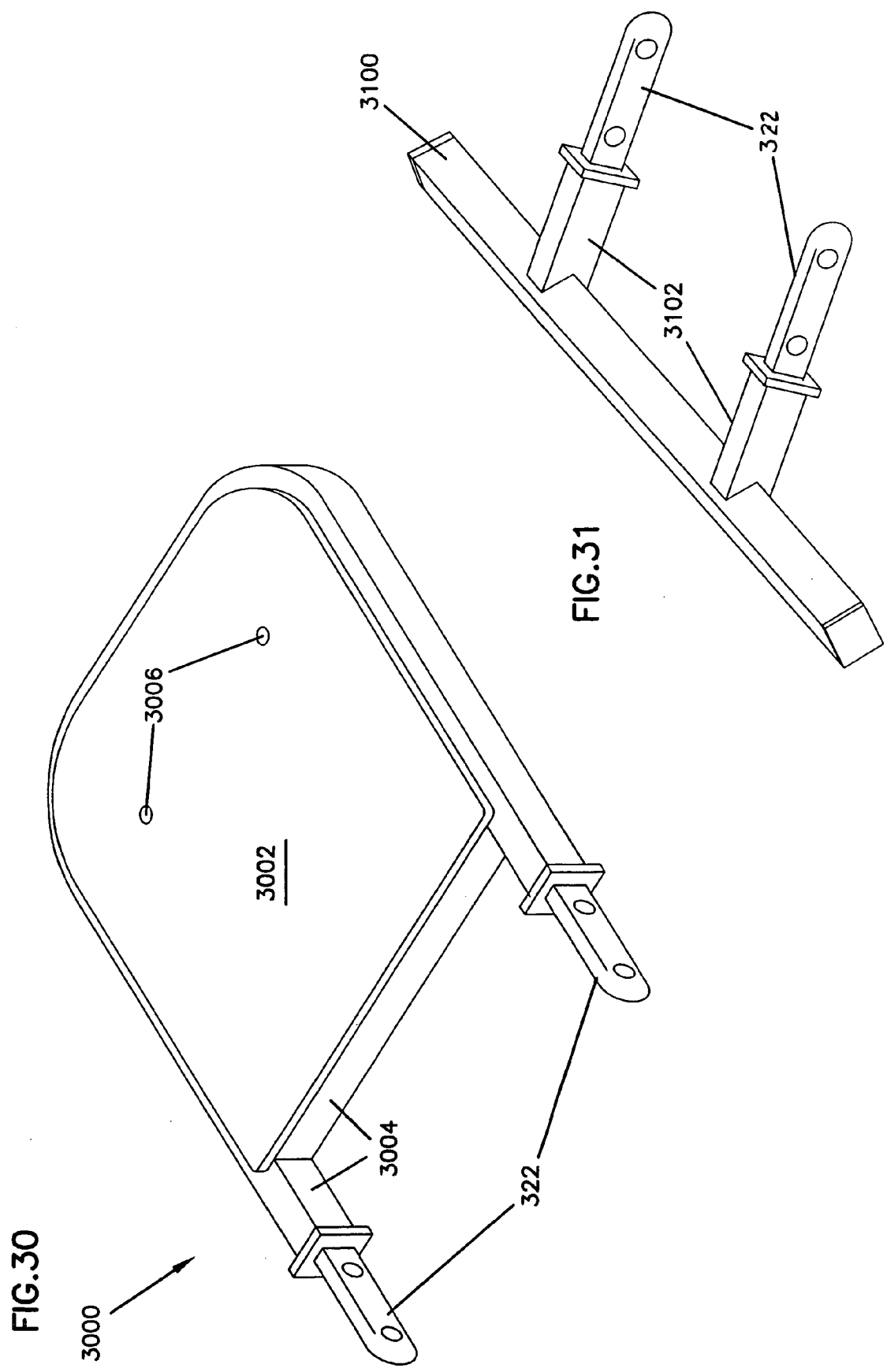

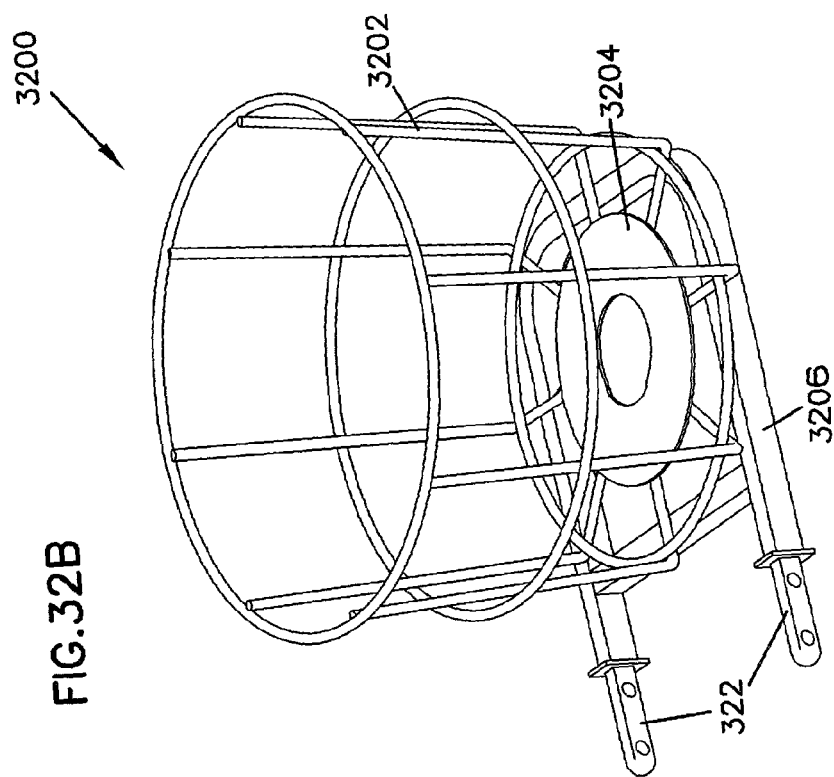
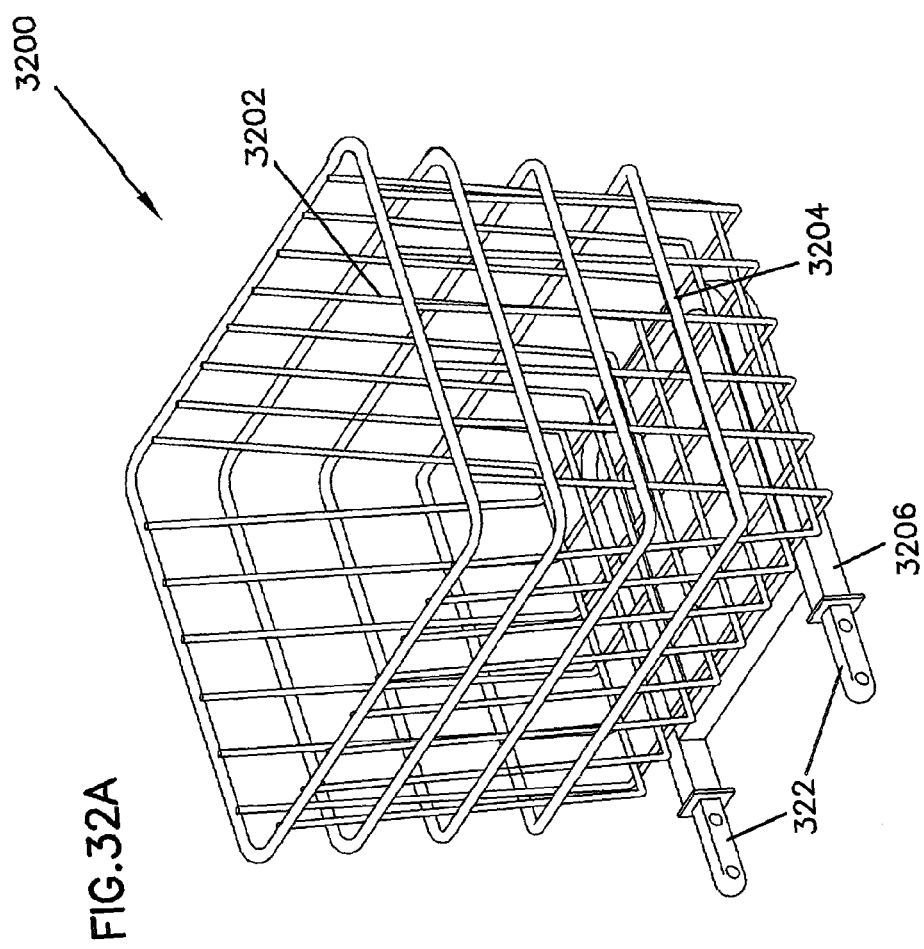

MATING RECEIVER RACK FOR PERSONAL RECREATIONAL VEHICLES

TECHNICAL FIELD

The invention relates generally to receiver racks for personal recreational vehicles, and more particularly to mating receiver racks for all-terrain vehicles.

BACKGROUND

Personal recreational vehicles, such as all-terrain vehicles (ATVs), have grown increasingly popular, both for recreational and utilitarian purposes. Today, ATVs are used for such diverse purposes as transporting workmen to remote and difficult to reach sites or permitting families to reach scenic sites for a picnic. As a consequence of their expanding role, ATVs are often used for carrying items. For example, in the case of the workman, the ATV may be used to carry tools, while in the case of the family, the ATV may be used to carry food and a grill.

In the prior art, little provision has been made with respect to the cargo carrying role of an ATV. Generally, if an ATV was to be used to carry a cargo unit, such as a grill, the item had to be strapped (as with a bungee cord) to a rack attached to the ATV. This scheme possessed drawbacks. For example, the process of securing a cargo unit to a rack can be time consuming, particularly if the item was of a shape that did not allow for easy coupling to a rack. Additionally, securing items with a bungee cord can be difficult to carry out reliably.

As is evident from the preceding discussion, there exists a need for a scheme to permit convenient and secure carrying of cargo by an ATV. A desirable scheme will be simple, rugged, and adaptable for carrying many different sorts of items.

SUMMARY

Against this backdrop, the present invention has been created. According to one embodiment of the invention, an all-terrain vehicle may be outfitted with a sectional receiver rack for carrying a cargo unit. The all-terrain vehicle possesses a mounting surface for the sectional receiver rack. A main receiver rack frame is connected to the surface. The main receiver rack frame possesses a plurality of couplers for connecting an auxilliary frame piece. The auxilliary frame piece is connected to the cargo unit, thereby permitting the cargo unit to be secured to the main receiver rack frame by coupling the main receiver rack frame to the auxilliary frame piece.

According to another embodiment of the invention, a receiver rack for use with an all-terrain vehicle includes a first tubular member dimensioned approximately to span the width of the all-terrain vehicle. Additionally, a second tubular member runs approximately parallel to the first tubular member. A plurality of cross-linking members connects the first and second tubular members. A plurality of mounting flanges is attached to the first and second tubular members. The receiver rack also includes a first auxilliary piece, which in turn includes a framework and a plurality of outwardly projecting members. The outwardly projecting members of the first auxilliary piece are dimensioned to fit within the first and second tubular members.

According to yet another embodiment of the invention, a sectional receiver rack for use with an all-terrain vehicle includes a main framework dimensioned approximately to fit atop the all-terrain vehicle to which the main framework is attached. The main framework is flat and has oppositely positioned first and second sides and a third side running between the first and second sides. A plurality of couplers is connected to each of the first, second and third sides of the main framework. The sectional receiver rack also includes first, second and third auxilliary frame pieces, which attach to the couplers connected to the first, second and third sides of the main framework. The couplers project outwardly from the main framework.

According to yet another embodiment of the invention, a personal recreational vehicle with an attached main framework is offered for sale. Production of cargo units having an attached auxilliary frame piece that can be coupled to the main framework is arranged. Finally, sale of the cargo units with the attached auxilliary frame piece is arranged.

BRIEF DESCRIPTION OF THE DRAWINGS

FIG. 7 depicts yet another exemplary cargo unit that has been adapted for cooperation with the sectional receiver rack, in accordance with one embodiment of the present invention.

FIG. 14A depicts an isometric view and FIG. 14B depicts a cross-sectional view of a bushing that maybe used in conjunction wit the receiver rack.

FIG. 14C depicts a cross-sectional view of another embodiment of the bushing depicted in FIG. 14A.

FIG. 17 depicts yet another embodiment of a sectional receiver rack.

FIG. 18 depicts a coupling button and o-ring, in accordance with one embodiment of the present invention.

FIGS. 19–31 and 32A, 32B, and 32C depict embodiments of various cargo units that have been adapted for cooperation with the sectional receiver rack, in accordance with one embodiment of the present invention.

DETAILED DESCRIPTION

The problem of securing a cargo unit to a personal recreational vehicle (such as an all-terrain vehicle) may be solved by utilization of a sectional receiver rack. A sectional receiver rack includes a main framework piece that is attached to a mounting surface of the personal recreational vehicle. The main framework may be flat and may be fashioned generally in the image of a cargo rack. The main framework may have mounting flanges for facilitating its connection to the recreational vehicle. The main framework may be dimensioned to span the mounting surface to which it is attached.

The main framework may have couplers along one or more portions of its periphery. The couplers enable the main framework to be joined to one or more auxilliary frame pieces that contain coupling members that mate with the couplers of the main framework. Additionally, cargo units may be built with coupling members attached thereto. The auxilliary frame piece may be removed, thereby exposing the couplers to which they were attached. The exposed couplers may be used for joining the cargo unit to the main framework. Accordingly, the cargo units may be secured to the main framework by joining their attached coupling members to the couplers attached to the main framework.

The above-described scheme allows for convenient and secure transportation of cargo units with a personal recreational vehicle. The discussion that follows presents the scheme in greater detail. Although the receiver rack described herein may be used with any personal recreation vehicle, (all-terrain vehicle, snowmobile, etc.), the remaining passages describe the receiver rack as it relates to all-terrain vehicles (ATVs).

As used herein, the term "ATV" refers to straddle-mounted vehicles that are driven by four or more wheels. Also, as used herein, the term "cargo unit" refers to: (1) any item carried by a receiver rack mounted upon a personal recreational vehicle; or (2) any item that is not an electrical or mechanical component of a personal recreational vehicle and is carried by said vehicle.

Figure 1:
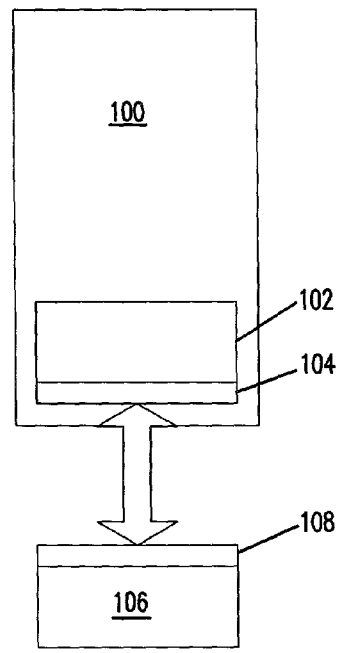
FIG. 1 depicts an ATV outfitted with a sectional receiver rack, which is composed of a main framework and a set of couplers.

FIG. 1 depicts an ATV 100 outfitted with a sectional receiver rack, which is composed of a main framework 102 and a set of couplers 104. The couplers 104 mate with a set of coupling members 108 that are attached to a cargo unit 106. Accordingly, the cargo unit 106 may be secured to the sectional receiver rack by mating the coupling members 108 on the cargo unit 106 to the couplers 104 on the main framework 102. Examples of cargo units 106 that may be outfitted with coupling members include, but are not limited to, a cooking grill, a vise, a workbench, a cooler, a gun rack, a cargo basket, and an auxilliary back rest, a storage box, a cord reel, a carryall, an articulating spool mount, a flatbed extension, a gun scabbard, a gear lock, a gear cradle, a fender box, a tool lock, a saw lock, a workbase, or a utility bar.

The above-described scheme possesses several advantages. First, the scheme permits convenient and reliable securing of the cargo unit 106 to the ATV 100. Second, the scheme permits the manufacturer of the ATV 100 to share in the revenue derived from the sale of the cargo unit 106.

Figure 2:
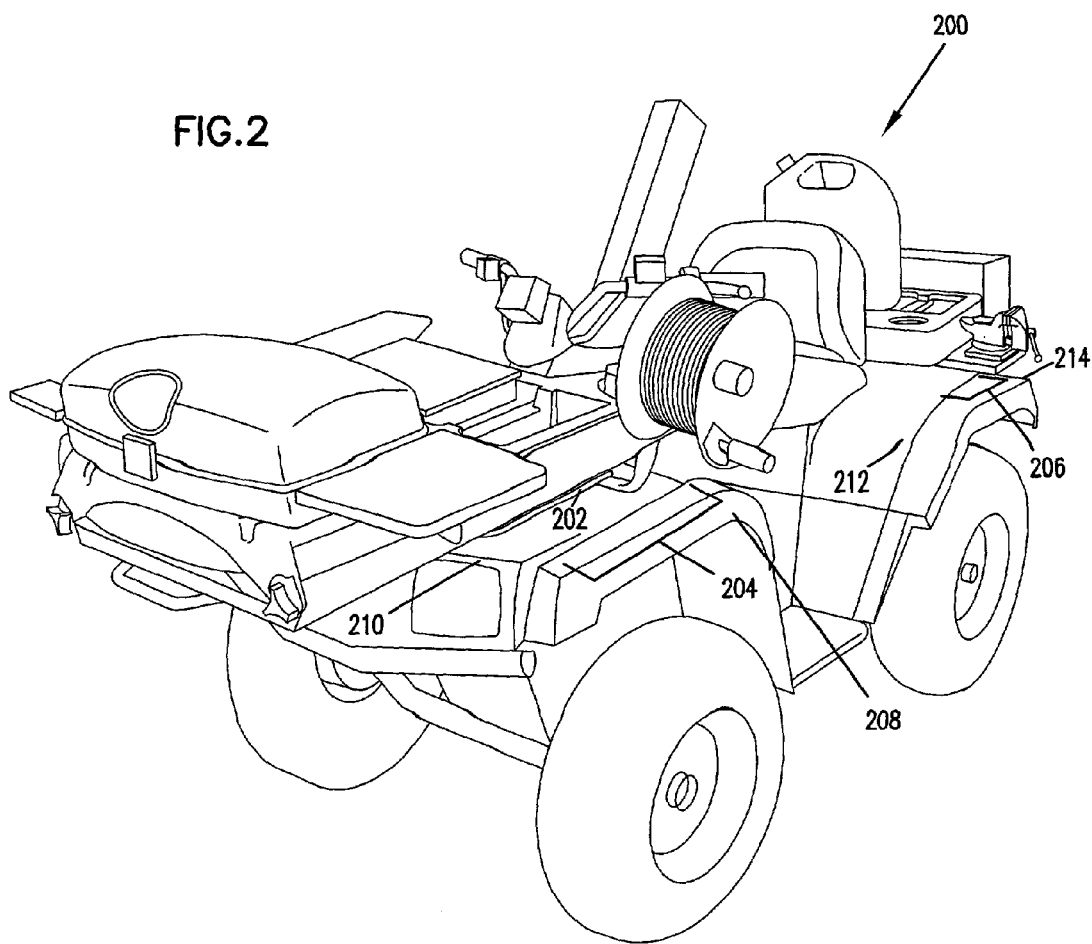
FIG. 2 depicts an ATV outfitted with a sectional receiver rack, in accordance with one embodiment of the invention.

FIG. 2 depicts an ATV 200 outfitted with a sectional receiver rack 202. Details regarding the construction of ATVs 200 are known in the art and therefore need not be discussed herein. As can be seen from FIG. 2, the ATV 200 possesses a forward mounting surface 204 and a rearward mounting surface 206. Each mounting surface 204 and 206 may serve as a platform upon which the sectional receiver rack 202 may be positioned. Thus, the ATV 200 may have as many receiver racks 202 as it has mounting surfaces 204 and 206. According to the embodiment depicted in FIG. 2, the forward mounting surface 204 extends from approximately the rear edge 208 of the front wheel well to the front edge 210 of the ATV 200. The forward mounting surface 204 spans the width of the ATV 200. The rearward mounting surface 206 extends from approximately the front edge 212 of the rear wheel well to the rear edge 214 of the ATV 200. The rearward mounting surface 206 also spans the width of the ATV 200. Other mounting locations and dimensions are possible, and are within the scope of this patent.

Figure 3:
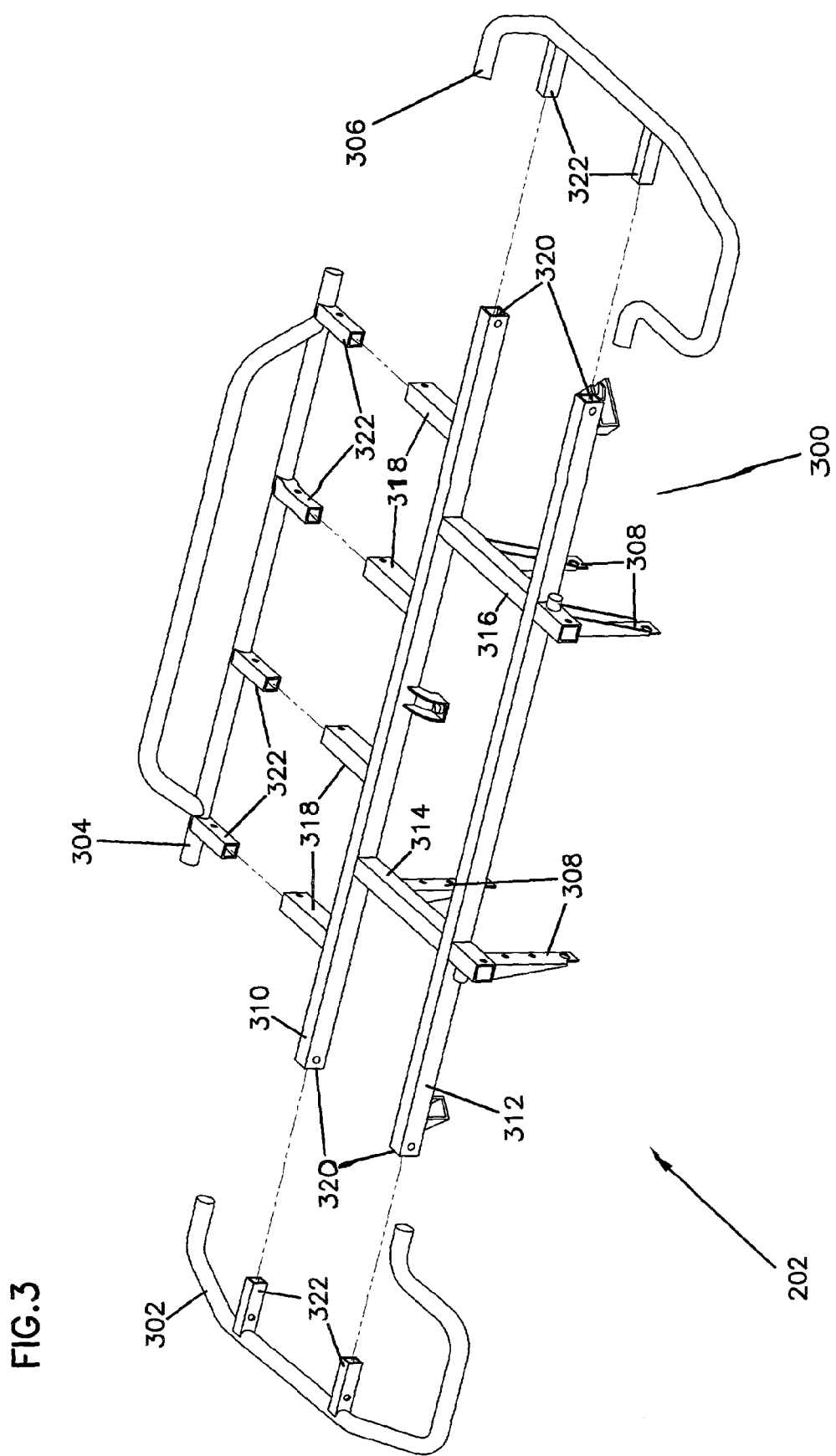
FIG. 3 depicts a sectional receiver rack, in accordance with one embodiment of the present invention.

FIG. 3 depicts a sectional receiver rack 202, in accordance with one embodiment of the present invention. As illustrated in FIG. 3, the receiver rack 202 includes a main framework 300 and three auxilliary frame pieces 302, 304, and 306. When assembled with the ATV 200, the main framework 300 rests atop a mounting surface 204 or 206 of the ATV 200. The main framework 300 may possess mounting flanges 308, which permit fastening (e.g., via a bolt) of the main framework 300 to the frame (not depicted) or other stable structural unit of the ATV 200.

According to the embodiment depicted in FIG. 3, the main framework 300 possesses two parallel, tubular members 310 and 312. The two members 310 and 312 are cross-linked via linking members 314 and 316. Along the periphery of the main framework are a plurality of couplers 318 and 320. The couplers 318 and 320 permit the auxilliary frame pieces 302, 304, and 306 to join the main framework 300. In some cases, the couplers 318 are separate members 318 that are attached to one of the two parallel, tubular members 310 or 312. In other cases, the end portions of the two parallel, tubular members 310 and 312 serve as couplers 320. In the embodiment depicted in FIG. 3, the auxilliary frame pieces 302, 304 and 306 possess coupling members 322. The coupling members 322 are dimensioned so as to permit their insertion into the couplers 318 and 320 of the main framework 300. Alternatively, the couplers 318 and 320 may be dimensioned to permit their insertion into the coupling members 322.

Figure 4:
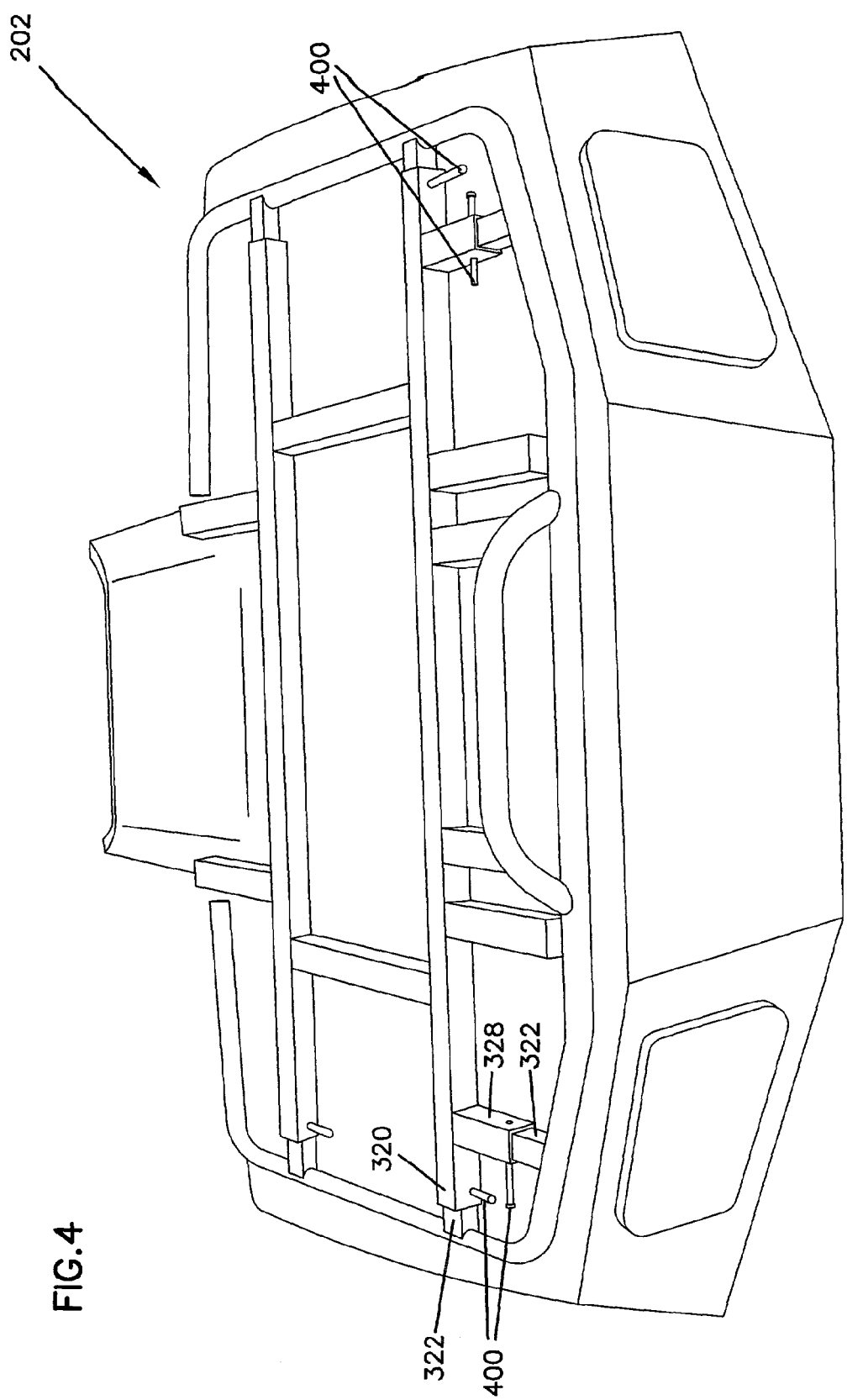
FIG. 4 depicts an assembled sectional receiver rack, in accordance with one embodiment of the present invention.

When the auxilliary frame pieces 302, 304, and 306 are joined to the main framework 300, the receiver rack 202 appears as a cargo rack, as is depicted in FIG. 4. The couplers 318 and 320 of the main framework 300 and the coupling members 322 of the auxilliary frame pieces 302, 304, and 306 may each possess a passage through which a restraining pin 400 may pass. As can be seen in FIG. 4, one or more restraining pins 400 may be used to secure the coupling members 322 within the couplers 318 and 320.

FIG. 14A depicts an isometric view and FIG. 14B depicts a cross-sectional view of one embodiment of a bushing 1400, in accordance with one embodiment of the present invention. The bushing 1400 has a set of side walls 1402, which form a cross-section that is generally congruous with the cross-section of the couplers 318 and 320 on the main framework 300. The outer length, l, and width, w, of the cross-section formed by the side walls 1402 are dimensioned such that the bushing 1400 can fit within the couplers 318 and 320 of the main framework 300.

The bushing 1400 may be inserted into the couplers 318 and 320 on the main framework 300. In turn, the coupling members 322 attached to a cargo unit 106 may be inserted into the bushing 1400. The bushing 1400 relaxes the tolerance requirements for the couplers 318 and 320 and coupling members 322. Additionally, the bushing 1400 prevents the coupling members 322 from rattling within the couplers 318 and 320 when the recreational vehicle is running.

To aid insertion of a coupling member 322 into the bushing, the interior cross-section of the bushing 1400 may taper inwardly. The tapering is depicted in the cross-sectional view of an alternative embodiment shown in FIG. 14C and is identified by reference numeral 1404. The bushing 1400 may be made of a flexible plastic, such as high-density polyethylene, to permit the bushing 1400 to conform to the geometries of both the couplers 318 and 320 and the coupling members 322.

As can also be seen from FIG. 14A, oppositely disposed side walls 1402 may be pierced, so as to provide a passage 1405 through which the previously mentioned restraining pin 400 may run.

Optionally, as depicted in FIG. 14B, the side walls 1402 may contain ribs 1406 that project outwardly. The ribs 1406 reduce the surface area of the bushing 1400 in contact with the couplers 318 and 320, thus reducing friction during insertion. The ribs 1406 may be slightly flexible. The flexibility of the ribs 1406 permits the ribs 1406 to compensate for tolerancing errors in the cross-sectional dimensions of the tubular member into which the bushing 1400 is inserted. The ribs 1406 also provide an advantage in aiding the gripping process between the bushing 1400 and the tubular member into which it is inserted.

Also depicted in FIG. 14B are optional longitudinal grooves 1408 that run along the interior surface of the bushing 1400. The longitudinal grooves 1408 reduce the surface are of the bushing 1400 in contact with the coupling members 322, thus reducing friction during insertion of the coupling members 322.

Figure 16:
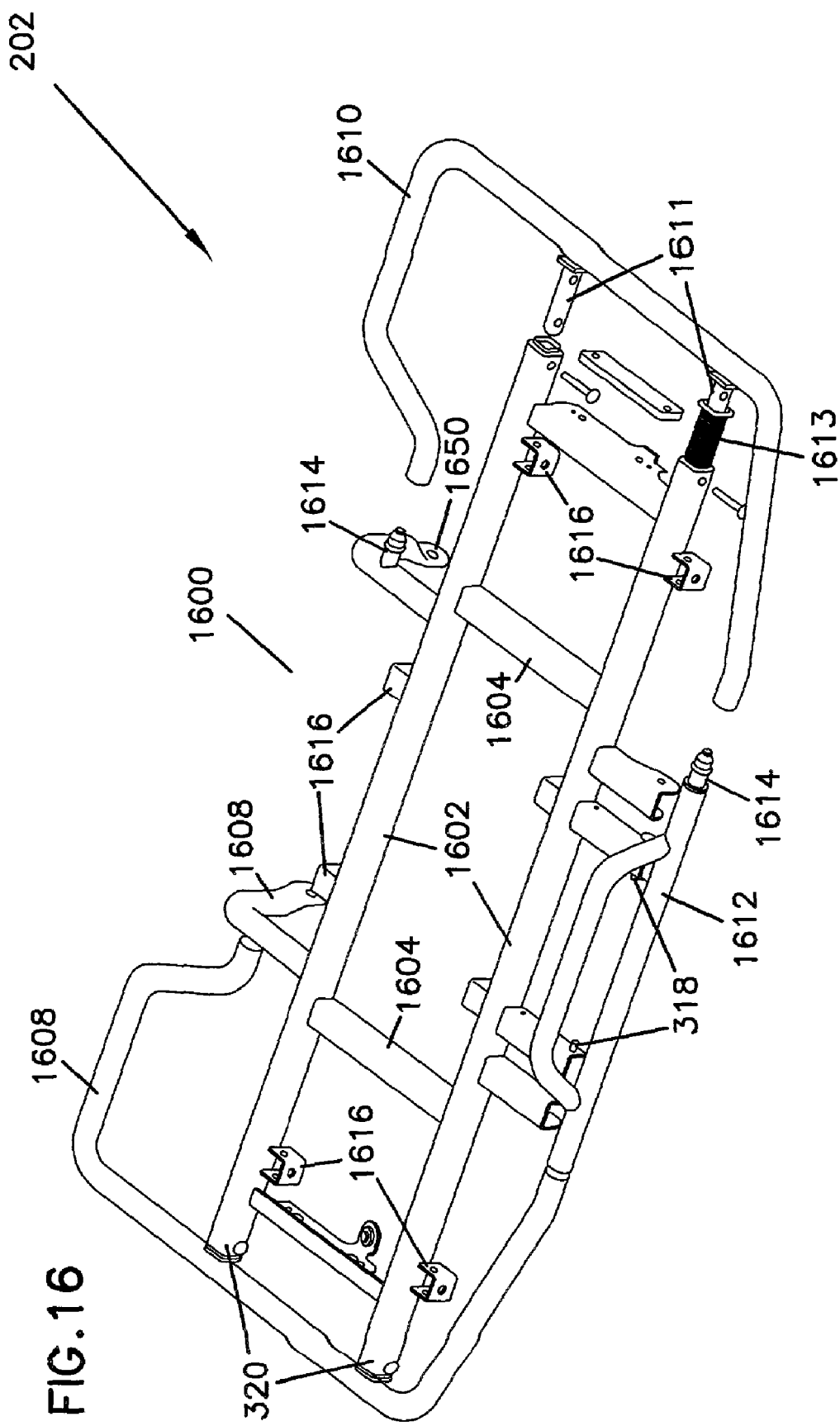
FIG. 16 depicts another embodiment of a sectional receiver rack.

FIG. 16 depicts another embodiment of a section receiver rack 202. The section receiver rack 202 includes a main framework 1600, which itself includes two substantially parallel tubular members 1602. Cross-linking members 1604 extend between the parallel tubular members 1602, providing lateral stability to the receiver rack 202. Mounting flanges 1616 may extend downwardly from one or both of the parallel tubular members 1602. The mounting flanges 1616 permit the rack 202 to be coupled to the ATV.

Like the embodiment depicted in FIG. 3, the embodiment of FIG. 16 utilizes couplers, which may be separate members, as in the case of couplers 318, or which may take on the form of the outermost portion of the tubular members 1602 themselves, as in couplers 320. The embodiment of FIG. 16 differs from the embodiment of FIG. 3 in certain respects. The embodiment of FIG. 16 includes auxilliary pieces 1608, 1610, and 1612, which fit to the main framework 1600, and fit to each other so as to form a continuous periphery. Where the outermost portions of the auxilliary pieces 1608, 1610, or 1612 connect to each other or to the main framework 1600, a coupling button 1614 is used. The coupling button 1614 is depicted in greater detail in FIG. 18.

As can be seen in FIG. 18, the coupling button 1614 is composed of a distal portion 1800 and a proximal portion 1802. The proximal portion 1802 is designed to mate with a given member of the sectional receiver rack 202. For example, the proximal portion 1802 may have a concave shaped end portion 1803, so as to permit the proximal portion 1802 to be welded to a cylindrical surface, such as the outer surface of a round mounting flange 1606, as shown in FIG. 16. Alternatively, the end portion 1803 may be flat, so as to permit the proximal portion 1802 to be mounted to a flat surface or to be inserted within the hollow end of the auxilliary pieces 1608, 1610, 1612. The distal portion 1800 has a groove 1806 machined into its surface. The groove 1806 mates with a rubber o-ring 1807. The o-ring 1807 fits between the coupling button 1614 and the inner surface of the hollow ends of the auxilliary pieces 1608, 1610, 1612. The o-ring 1807 is slightly flexible, meaning that it can compensate for tolerancing errors of the auxilliary frame pieces 1608, 1610, 1612. Also, the o-ring 1807 dampens noise that might be generated by the hollow ends of the auxilliary pieces 1608, 1610, 1612 chattering with the coupling button 1614. The distal portion 1800 of the coupling button 1614 is tapered at its end 1808, so as to permit the hollow ends of the auxilliary pieces 1608, 1610, and 1612 to fit easily over the coupling button 1614.

Returning to FIG. 16, the auxilliary pieces 1608, 1610, and 1612 include coupling members 1611. Unlike the coupling members 322 depicted with the embodiment of FIG. 3, the coupling members 1611 of FIG. 16 are solid pieces (not tubular). The solid coupling members 1611 are dimensioned to as to substantially vertically fill the interior of the bushing 1613 into which it is inserted (such as the bushing depicted in FIGS. 14A and 14B), but to be substantially horizontally smaller than the interior of the bushing. Thus, the coupling member 1611 allows for tolerancing error in the horizontal direction. Optionally, the solid coupling members 322 may be pierced to permit a restraining pin to pass through.

As can also be seen from FIG. 16, vertically oriented couplers 1616 are attached to the main framework 1600. The vertically oriented couplers 1616 permit a cargo unit 106 to be mounted in a plane perpendicular to that which results from mounting via couplers 320 or 318. The vertically oriented couplers 1616 have the same cross-sectional dimensions as do couplers 318 or 320, and may be pierced to permit a restraining pin to pass through. Additionally, the vertically oriented couplers 1616 are disposed in relation to each other in a manner identical to that of the horizontally disposed couplers 318 and 320, thereby permitting any cargo unit to mate with either the horizontally disposed couplers 318 and 320 or the vertically oriented couplers 1616. The vertically oriented couplers 1616 are useful for certain forms of cargo units 106, such as winches, which are activated along a direction dictated by the orientation of mounting to the ATV.

FIG. 17 depicts yet another embodiment of the sectional receiver rack 202. Like the embodiment depicted in FIG. 16, the embodiment of FIG. 17 includes two substantially parallel tubular members 1702. The tubular members 1702 are joined by cross-linking members 1704. The rack 202 includes mounting flanges 1706. The rack 202 also includes auxilliary frame pieces 1708, 1710, and 1712, which cooperate to form a continuous periphery. Once again, where the outermost portions of the auxilliary pieces 1708, 1710, or 1712 connect to each other or to the main framework 1700, a coupling button 1714 (identical to coupling bouton 1614) is used. Again, solid coupling members 1711 are utilized. The solid coupling members cooperate with the bushings 1713 to form a snug connection between the auxilliary frame pieces 1708, 1710, and 1712 and the main framework 1700. Furthermore, vertically oriented couplers 1716 are utilized. The embodiment of FIG. 17 differs from the embodiment of FIG. 16 mainly in that it possesses additional coupling members 318, and uses its cross-linking members 1704 as couplers 318. Additionally, the parallel tubular members 1702 may be constructed of more than one section of tubing.

Figure 5:
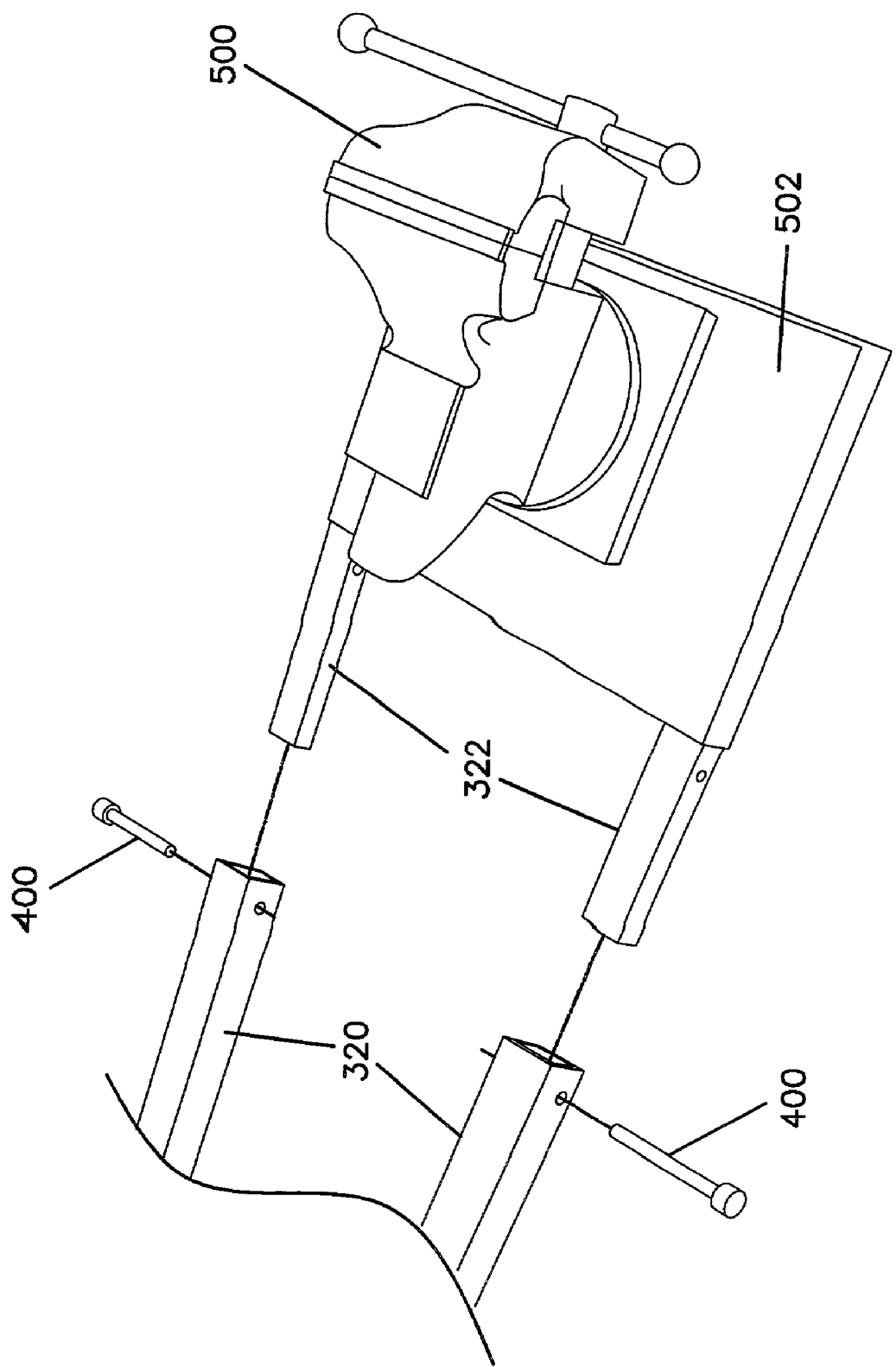
FIG. 5 depicts an exemplary cargo unit that has been adapted for cooperation with the sectional receiver rack, in accordance with one embodiment of the present invention.

FIG. 5 depicts an exemplary cargo unit 500 that has been adapted for cooperation with the sectional receiver rack 202. The cargo unit 500 depicted in FIG. 5 is a vise. The vise 500 is mounted atop a platform 502. On the periphery of the platform 502 are two coupling members 322. As described with reference to FIGS. 3 and 4, the coupling members 322 are dimensioned so that they may be inserted into the couplers 318, 320 of the main framework 300, thereby securing the vise 500 to the main framework 300. Restraining pins 400 are used to lock the coupling members 322 within the couplers 318, 320. Accordingly, the vise 500 may be secured to the main framework 300 by virtue of its couplers, rather than via use of bungee cord or some other improvised attaching means.

Figure 6A:
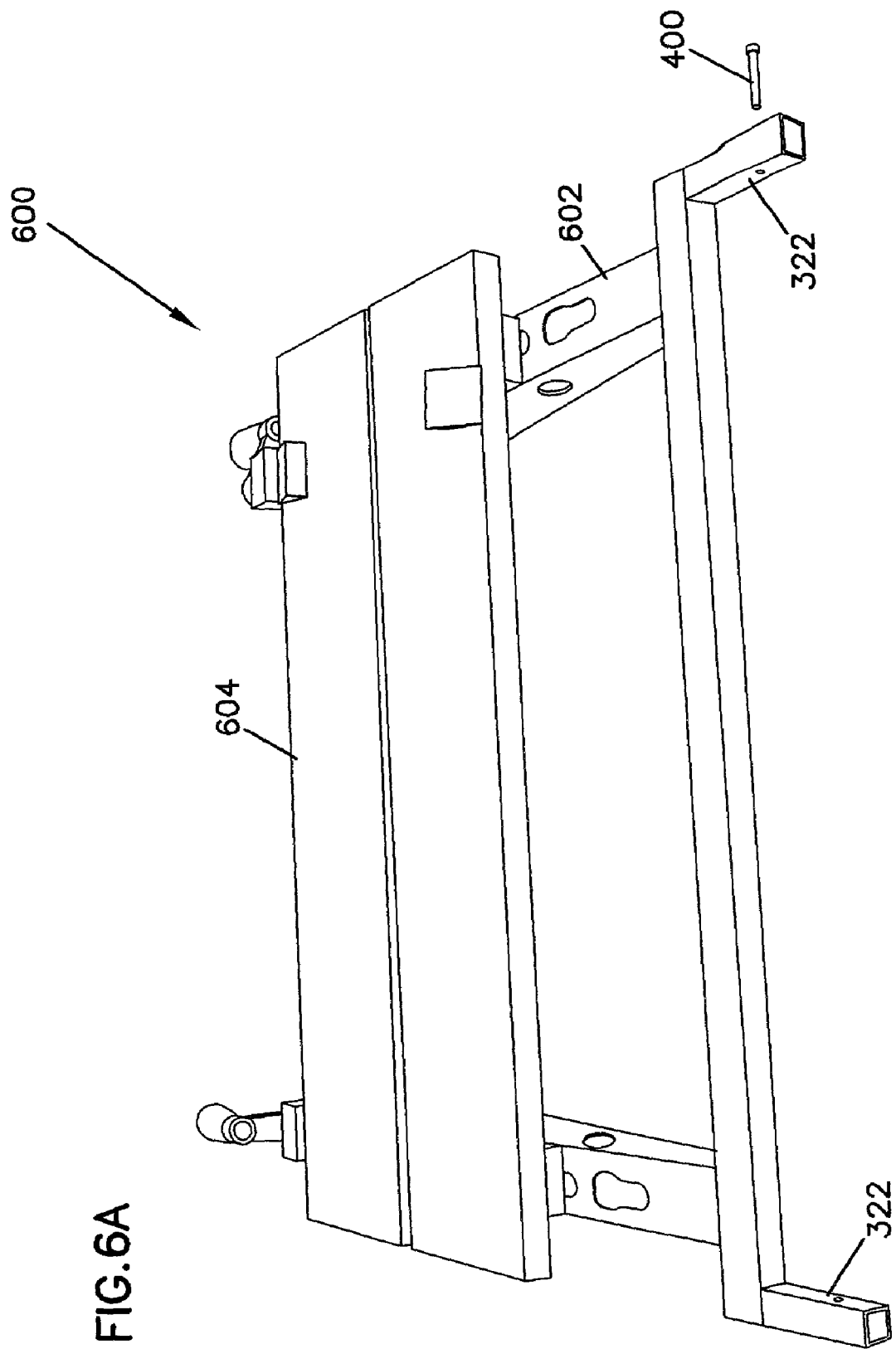
FIG. 6A depicts another exemplary cargo unit that has been adapted for cooperation with the sectional receiver rack, in accordance with one embodiment of the present invention.
Figure 6B:
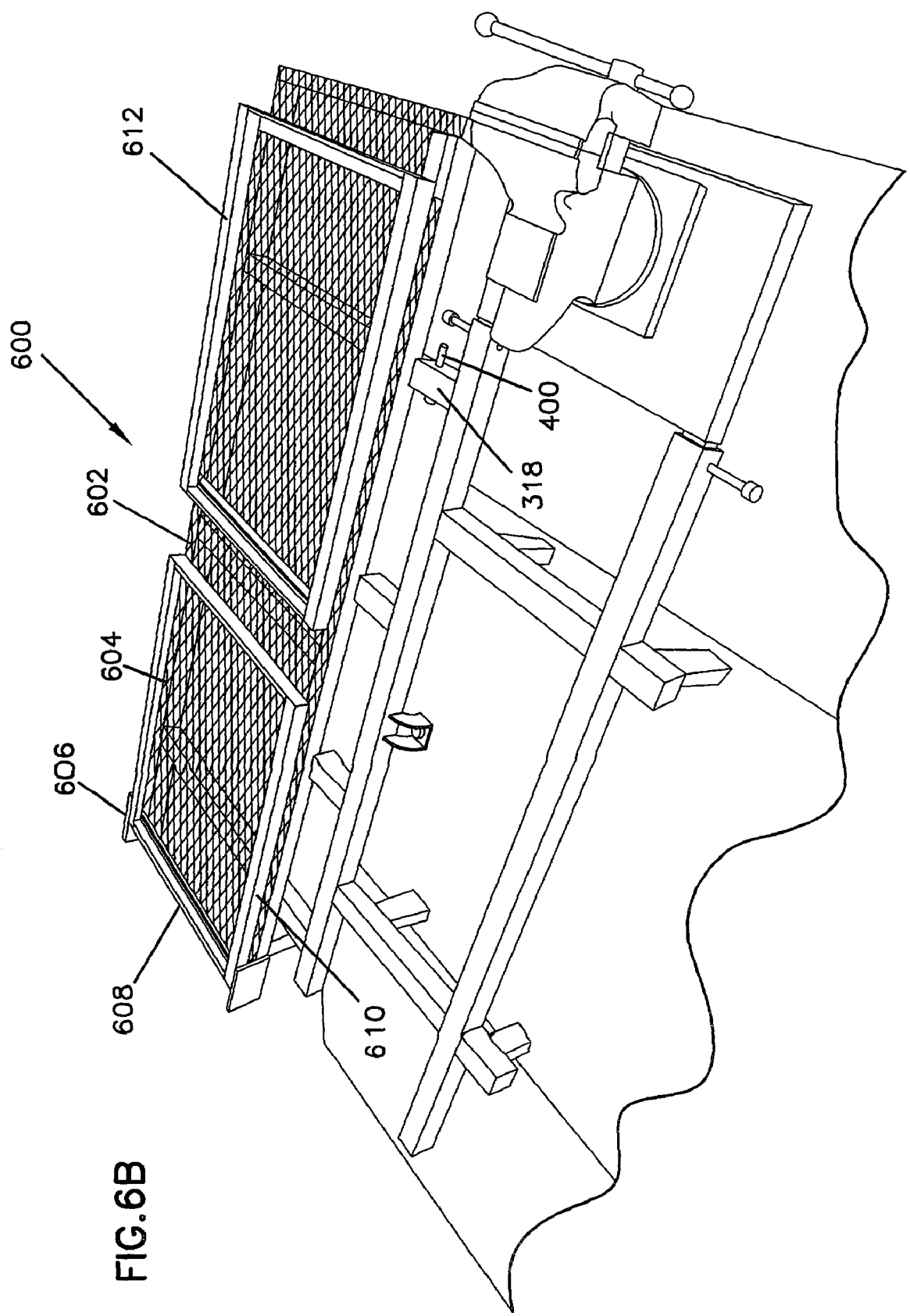
FIG. 6B depicts yet another exemplary cargo unit that has been adapted for cooperation with the sectional receiver rack, in accordance with one embodiment of the present invention.
Figure 6C:
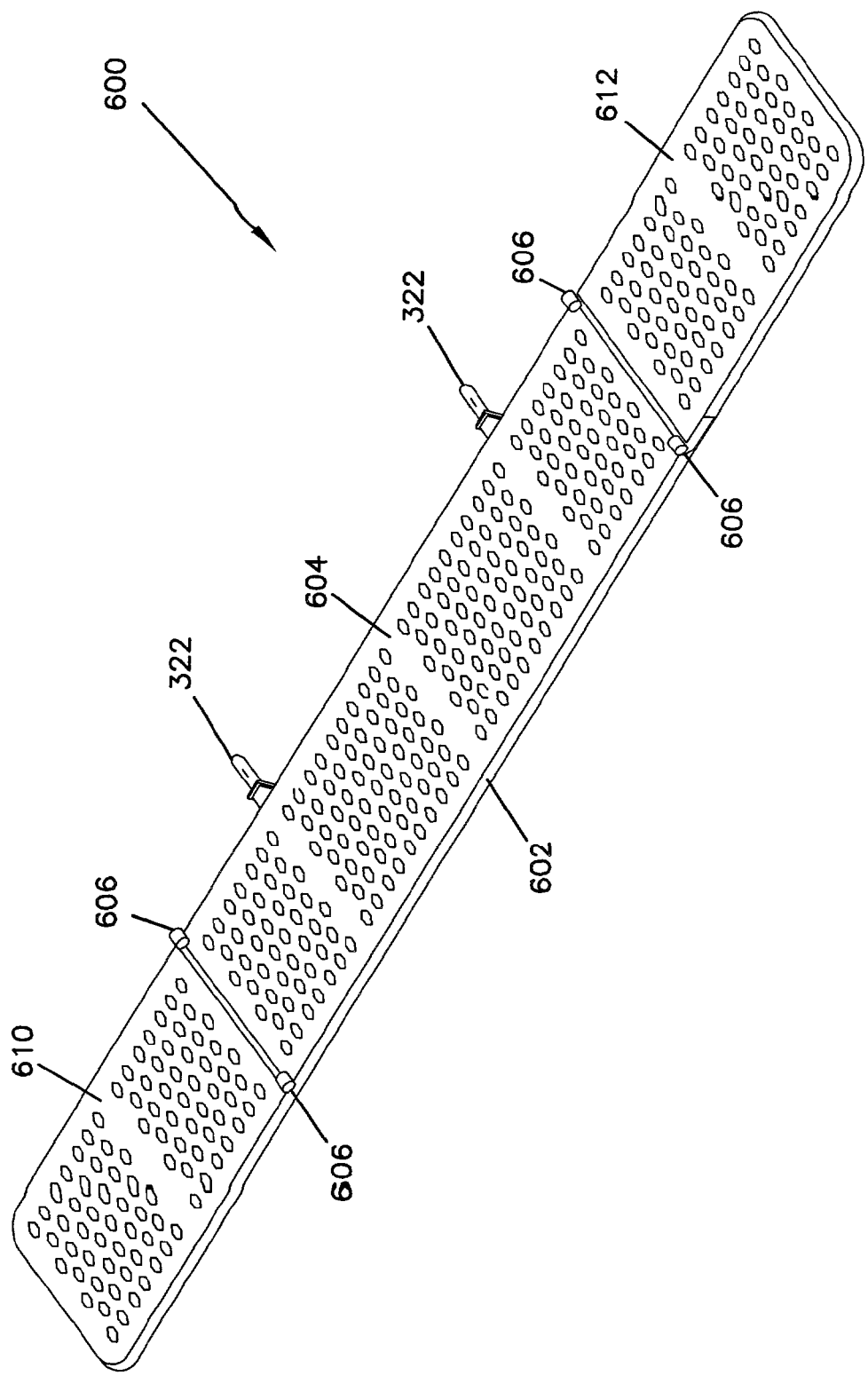
FIG. 6C depicts yet another exemplary cargo unit that has been adapted for cooperation with the sectional receiver rack, in accordance with one embodiment of the present invention.

FIGS. 6A, 6B, and 6C depict two exemplary cargo units 600 that have been adapted for cooperation with the sectional receiver rack 202. The cargo units 600 depicted in FIGS. 6A, 6B, and 6C is a workbench. The workbench 600 includes a frame 602, atop which a work surface 604 is attached. The work surface 604 may be a flat, solid surface, as shown in FIG. 6A, may be a metallic mesh 604, as shown in FIG. 6B, or may be a perforated metal, as shown in FIG. 6C. In any embodiment, the frame 602 has a plurality of coupling members 322 positioned along the edge of the frame 602 that is proximal to the main framework 300. Once again, the coupling members 322 are dimensioned so that they may be inserted into the couplers 318, 320 of the main framework 300, thereby securing the workbench 600 to the main framework 300. Restraining pins 400 are used to lock the coupling members 322 within the couplers 318, 320. In the embodiment depicted in FIGS. 6B and 6C the frame 602 possesses hinges 606 along its lateral edges 608. The hinges 606 join the frame 602 to auxilliary frame units 610, 612. The auxilliary frame units 610, 612 may be rotated to rest upon the frame 602, so that the auxilliary frame units 610, 612 do not protrude beyond the lateral edges of the ATV. Conversely, the auxilliary frame units 610, 612 may be rotated into an unfolded position, so that the work surface of the workbench 600 extends beyond the lateral edges of the ATV.

FIG. 7 depicts yet another exemplary cargo unit 700 that has been adapted for cooperation with the sectional receiver rack 202. The cargo unit 700 depicted in FIG. 7 is a cooking grill. The grill 700 is secured within a frame 702. The frame 702 has a plurality of coupling members 322 positioned along the edge of the frame 702. As shown in FIG. 7, the coupling members 322 may be defined by a rigid U-shaped tubular structure 704. Again, the coupling members 322 are dimensioned so that they may be inserted into the couplers 318, 320 of the main framework 300, thereby securing the workbench 700 to the main framework 300. The U-shaped structure 704 is, in turn, coupled to the frame 702. The U-shaped structure 704 serves as a base upon which the grill 700 may rest. When the grill 700 is inserted within the frame 702, the frame 702 runs along the periphery of the grill 700, thereby laterally securing the grill 700.

Figure 8:
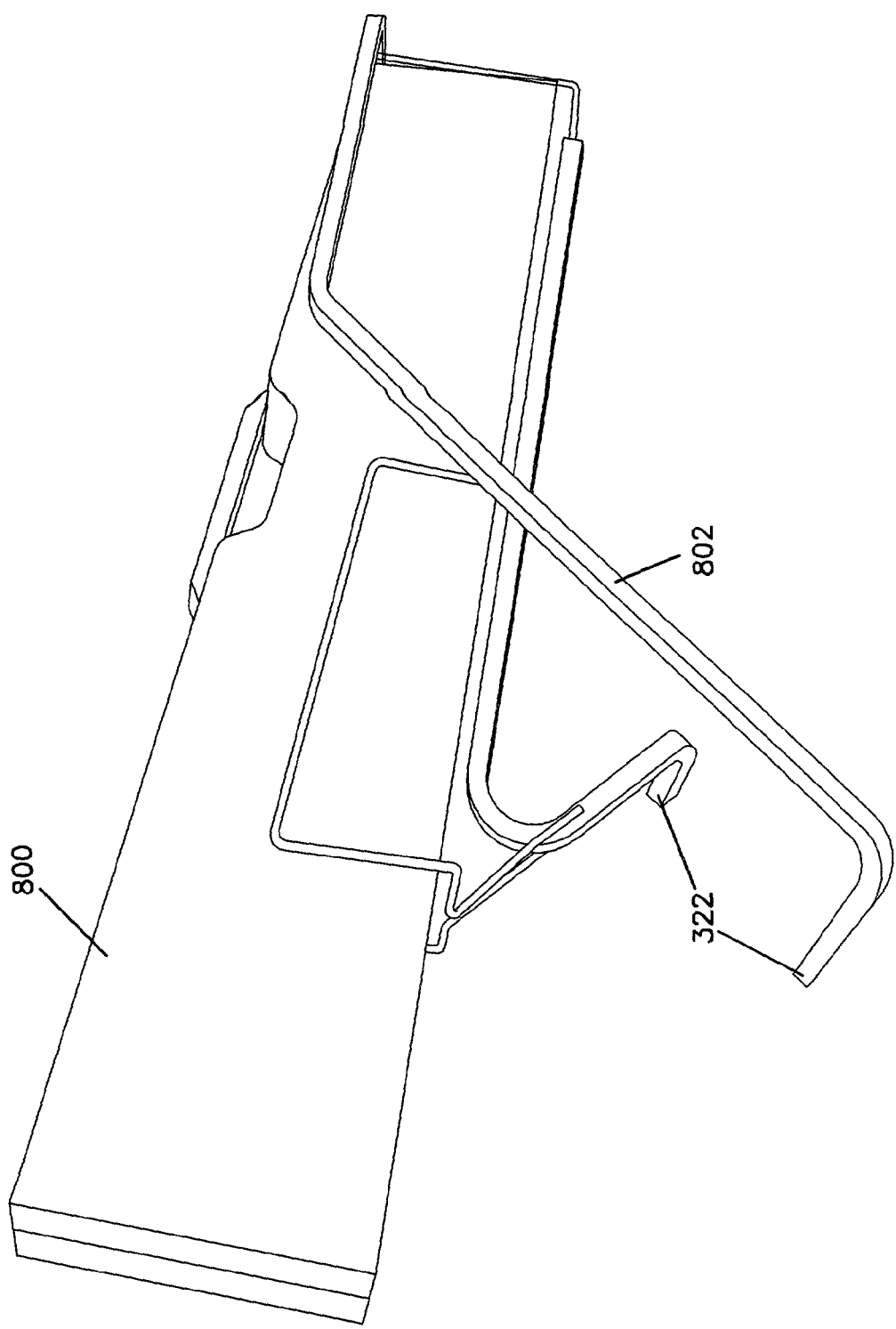
FIG. 8 depicts yet another exemplary cargo unit that has been adapted for cooperation with the sectional receiver rack, in accordance with one embodiment of the present invention.

FIG. 8 depicts yet another exemplary cargo unit 800 that has been adapted for cooperation with the sectional receiver rack 202. The cargo unit 800 depicted in FIG. 8 is a gun rack. The gun rack 800 is held by a frame 802. The frame 802 has a plurality of coupling members 322, which are dimensioned so that they may be inserted into the couplers 318, 320 of the main framework 300.

Figure 9:
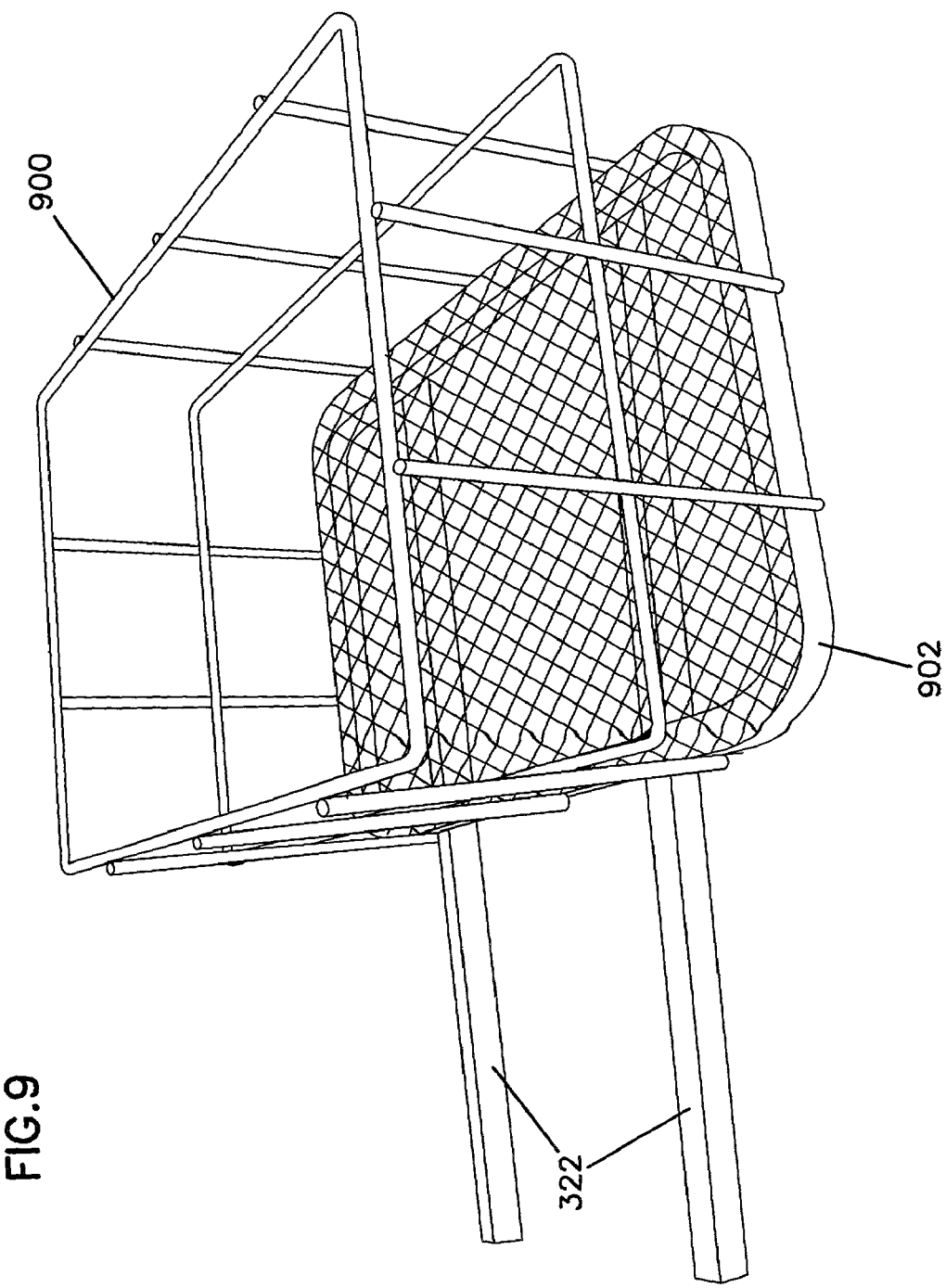
FIG. 9 depicts yet another exemplary cargo unit that has been adapted for cooperation with the sectional receiver rack, in accordance with one embodiment of the present invention.

FIG. 9 depicts yet another exemplary cargo unit 900 that has been adapted for cooperation with the section receiver rack 202. The cargo unit 900 depicted in FIG. 9 is a cargo basket. The bottom surface of the cargo basket 900 is mounted to a frame 902. The frame 902 has a plurality of coupling members 322, which are dimensioned so that they may be inserted into couplers 318, 320 of the main framework 300.

Figure 10:
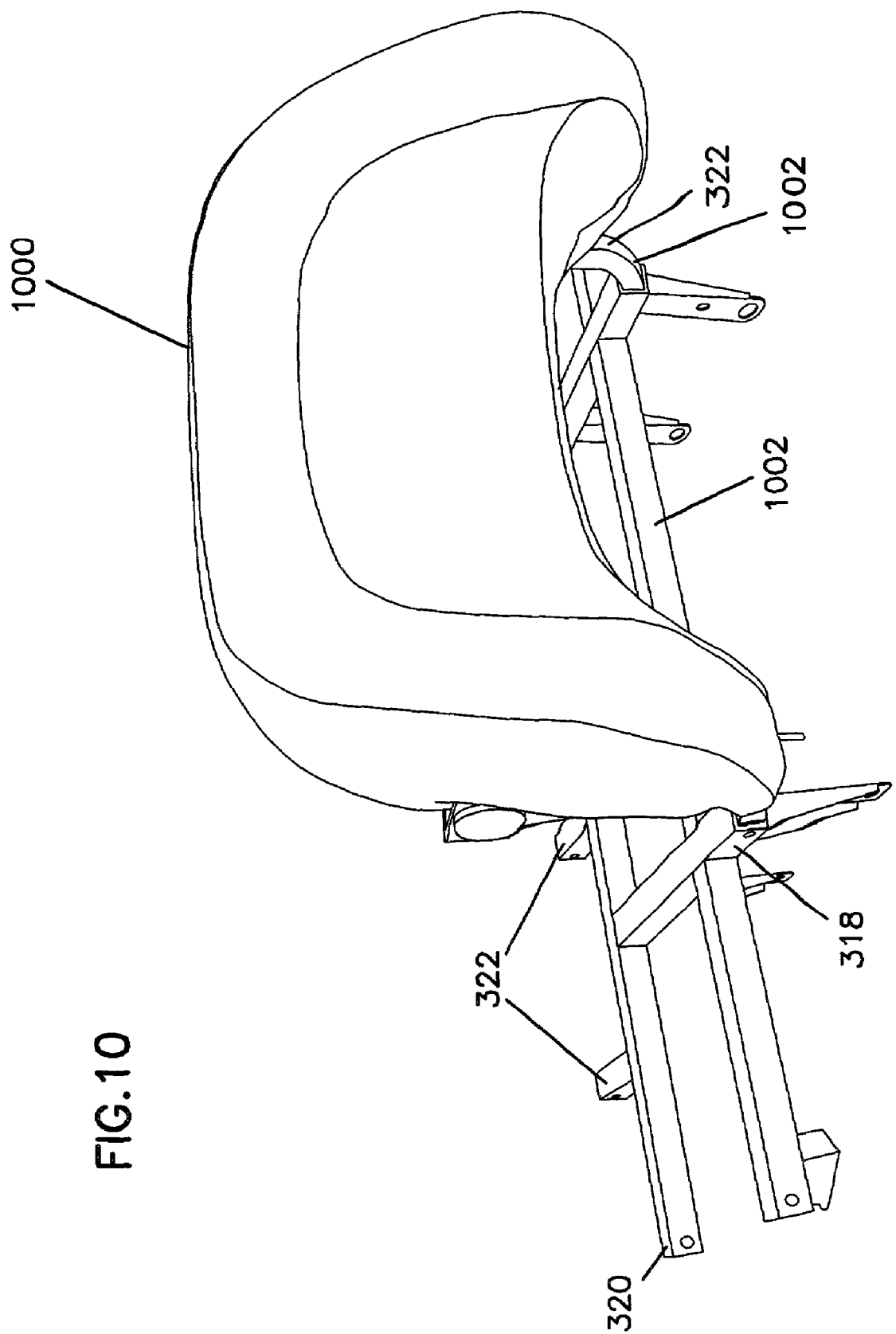
FIG. 10 depicts yet another exemplary cargo unit that has been adapted for cooperation with the sectional receiver rack, in accordance with one embodiment of the present invention.

FIG. 10 depicts yet another exemplary cargo unit 1000 that has been adapted for cooperation with the sectional receiver rack 202. The cargo unit 1000 depicted in FIG. 10 is an auxilliary back rest, which provides back support for the driver of the recreational vehicle. The back rest 1000 is mounted to a frame 1002, the ends of which may double as coupling members 322. The coupling members 322 are dimensioned so that they may be inserted into the couplers 318, 320 of the main framework 300.

Figure 11:
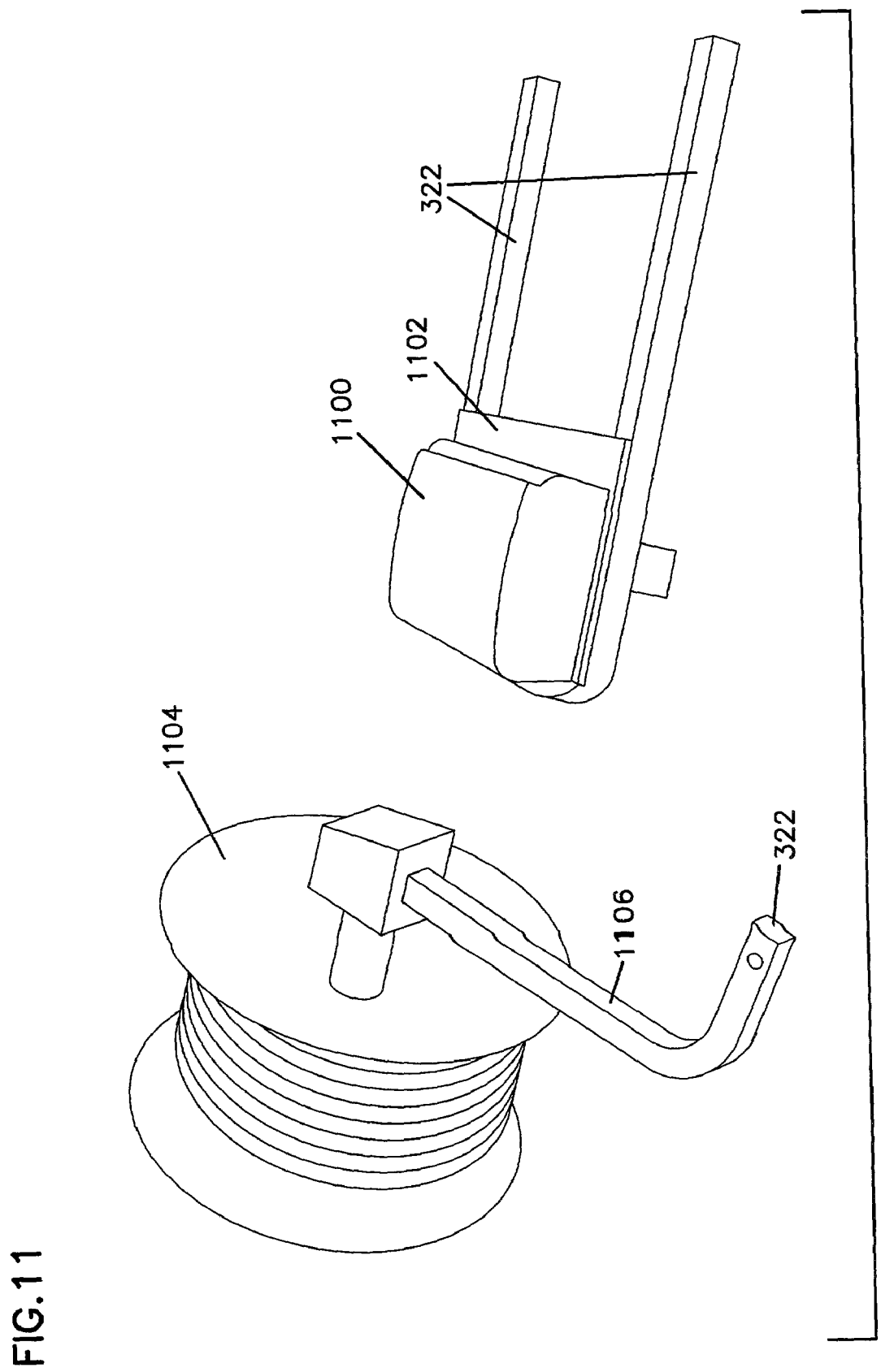
FIG. 11 depicts two other exemplary cargo units that have been adapted for cooperation with the sectional receiver rack, in accordance with one embodiment of the present invention.

FIG. 11 depicts a power inverter 1100 and an electrical cord reel 1104 which have been adapted for cooperation with the sectional receiver rack 202. The power inverter 1100 and the electrical cord reel 1104 are each mounted to frames 1102 and 1106, which are connected to one or more coupling members 322. The power inverter 1100 is used to convert 12 volt direct current (DC) power into 110 volt alternating current (AC) power. The electrical cord reel 1104 is used to carry the power cord, which may distribute power from the inverter 1100.

Figure 19:
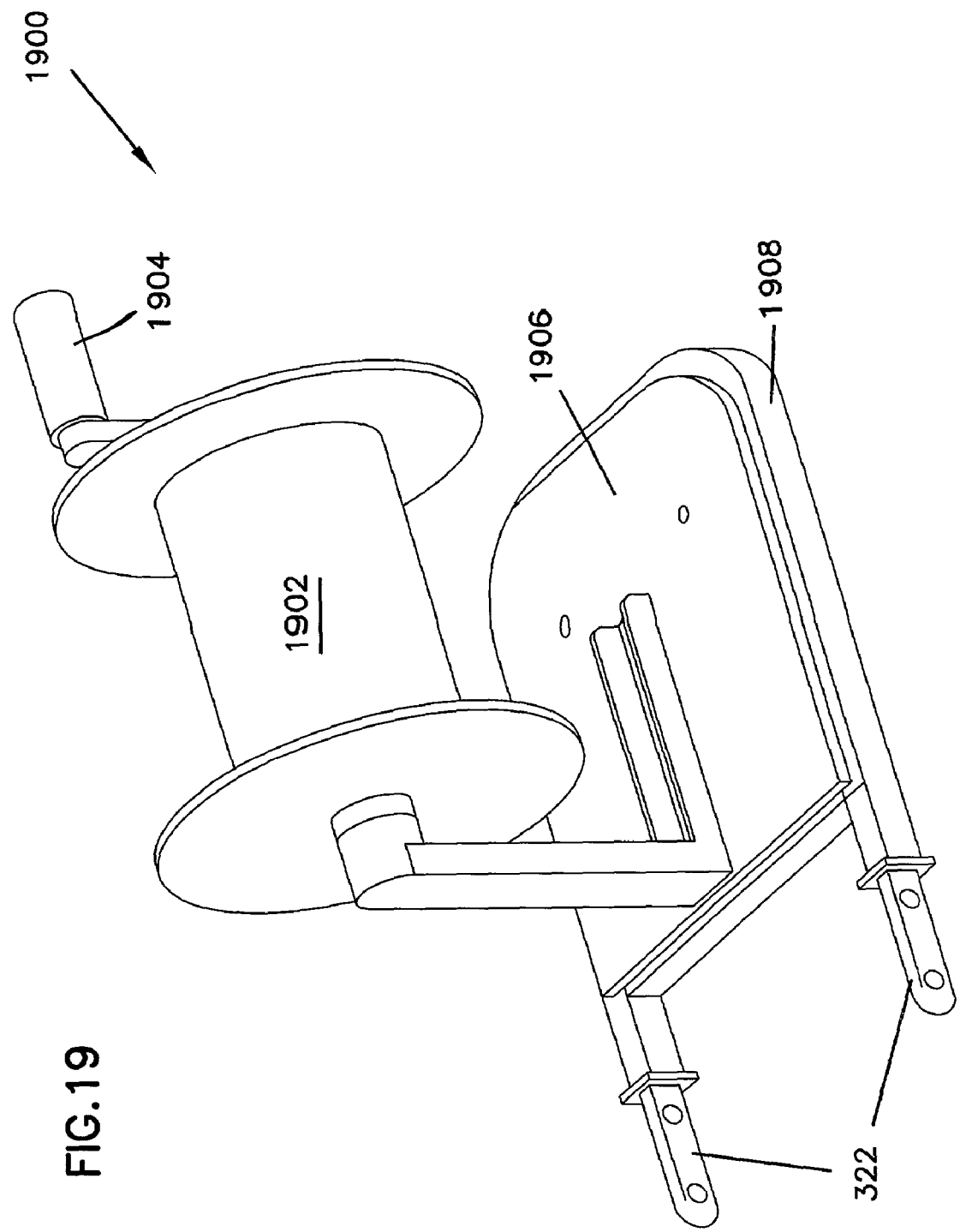

FIG. 19 depicts a cord reel 1900 that has been adapted for cooperation with the sectional receiver rack 202. The cord reel 1900 has a rotatable reel portion 1902 which is free to spin, and may be used to coil wire, rope, cord, or other such materials. A handle 1904 may be used to cause the reel 1902 to spin. The reel is mounted to a base 1906, which is, in turn, mounted atop a frame 1908. The frame 1908 includes coupling members 322, which may be used to secure the cord reel 1900 to the receiver rack 202.

Figure 20:
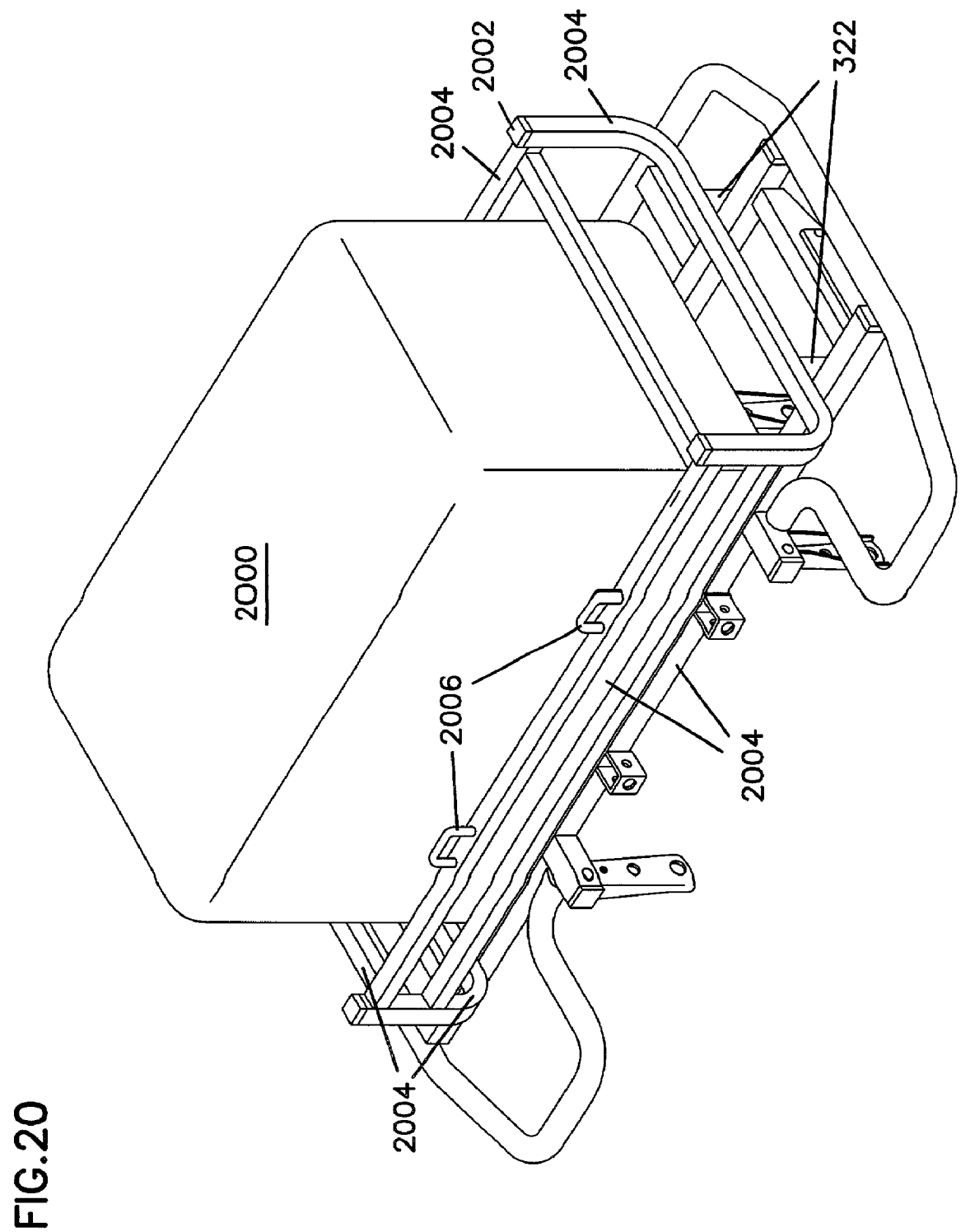

FIG. 20 depicts a carryall 2000 that has been adapted for cooperation with the sectional receiver rack 202. The carryall 2000 may take on the form of a cooler, box, basket, etc. The carryall 2000 is held within a frame 2002 The frame 2002 includes restraining members 2004 that run along the periphery of the caryall 2000, and serve to hold the caryall 2000. Attached to the restraining members 2004 are coupling members 322, which may cooperate with vertically oriented couplers mounts, such as are shown in FIGS. 16 and 17 (1616 and 1716) to secure the frame 2002 to the sectional receiver rack 202. The restraining members may include hook members 2006 that protrude upwardly therefrom. The hook members 2006 may be used to secure a cord, strap, or rope across the top of the caryall 2000, so as to hold the carryall 200 within the frame 2002.

Figure 21:
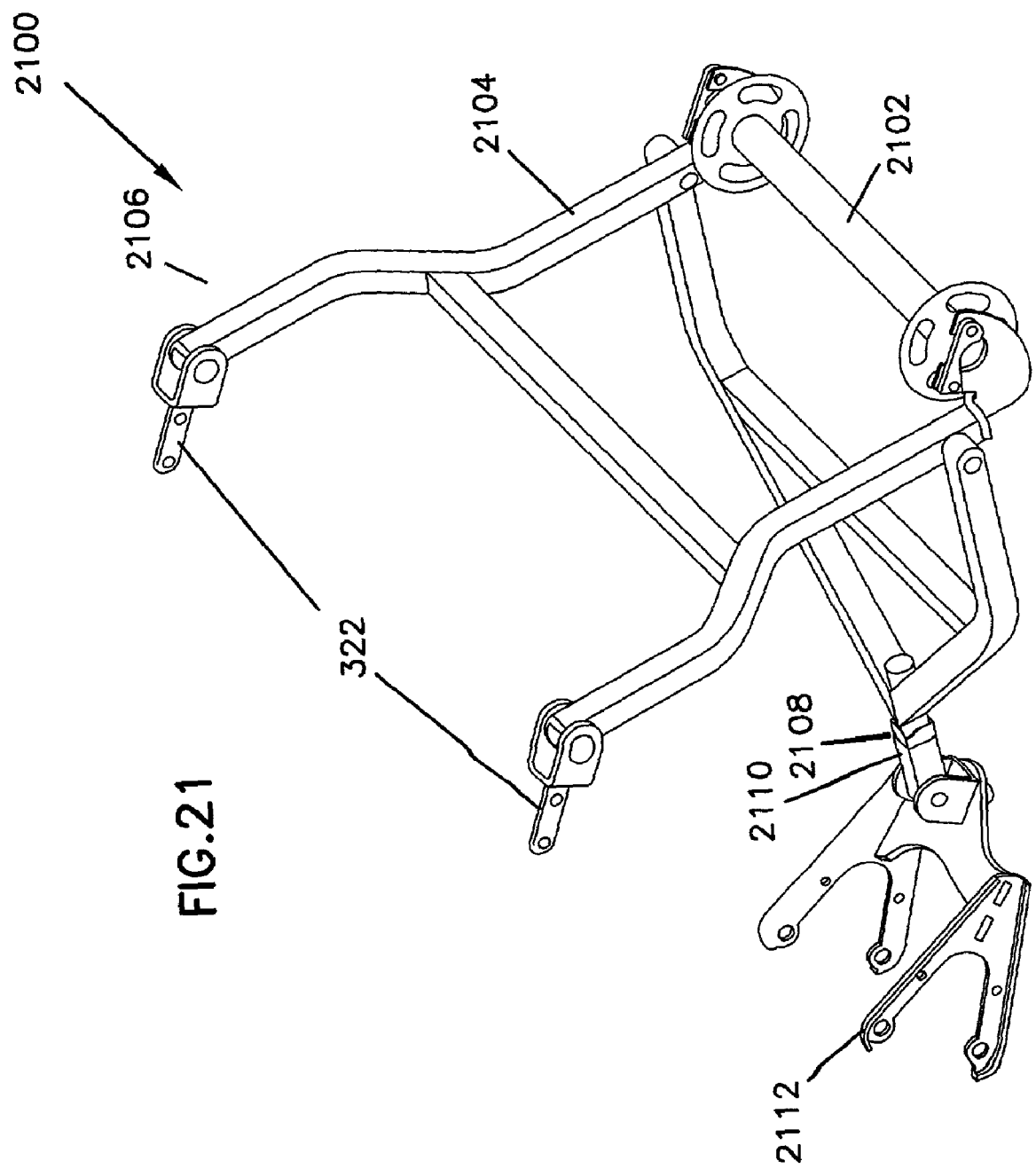

FIG. 21 depicts an articulating spool mount 2100 that has been adapted for cooperation with the sectional receiver rack 202. The spool mount 2100 possess a rotatable spool portion 2102. A coil of barbed wire, hose, cord, cable, or other such material may be wound around the rotatable spool portion 2102. The spool portion 2102 is releasably connected on either end to a frame 2104. The frame 2104 has two ends, a rack-mounted end 2106 and a hitch-mounted end 2108. The rack-mounted end 2106 of the frame 2104 includes two coupling members 322, which permit the articulating spool mount 2100 to be secured to the sectional receiver rack 202. The hitch-mounted end 2108 of the frame 2104 includes a protruding member 2110 that mates with an ATV hitch 2112, which is a permanent part of the rear axle (not shown) of the ATV.

Figure 22:
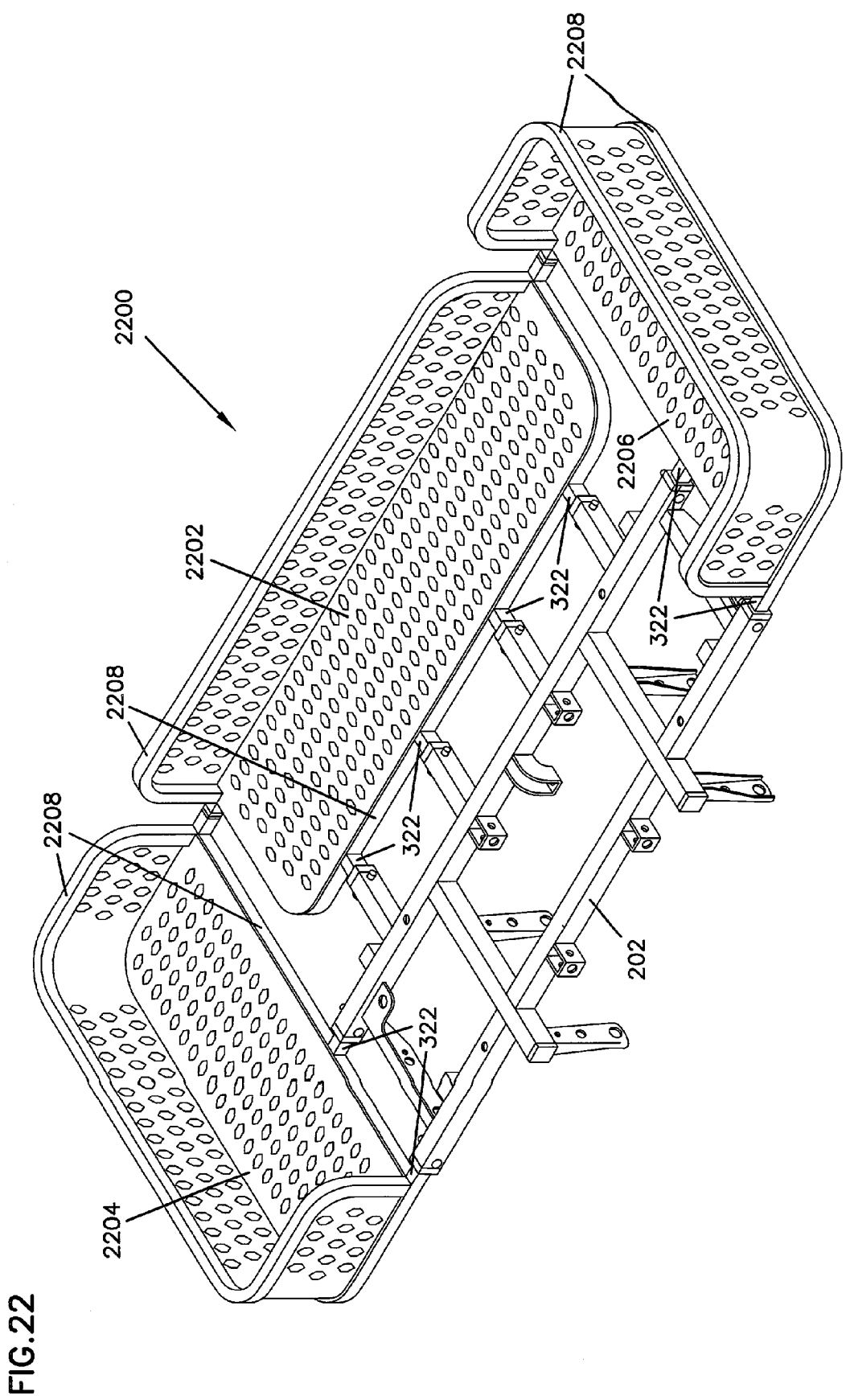

FIG. 22 depicts a carrying device 2200 that has been adapted for cooperation with the sectional receiver rack 202. The carrying device 2200 is composed of a middle piece 2202 flanked by two end pieces 2204, 2206. Each of the pieces 2202, 2204, and 2206 are composed of perforated metal fastened to a frame 2208. Perforated metal is desirable because it is flat and smooth. Attached to the frames of the pieces 2202, 2204, and 2206 are a plurality of coupling members 322, which serve to secure the various pieces 2202, 2204, and 2206 to the rack 202 Together, the middle piece 2202 and end pieces 2204, 2206 cooperate to form a partially enclosed volume in which an object may be carried.

Figure 23:
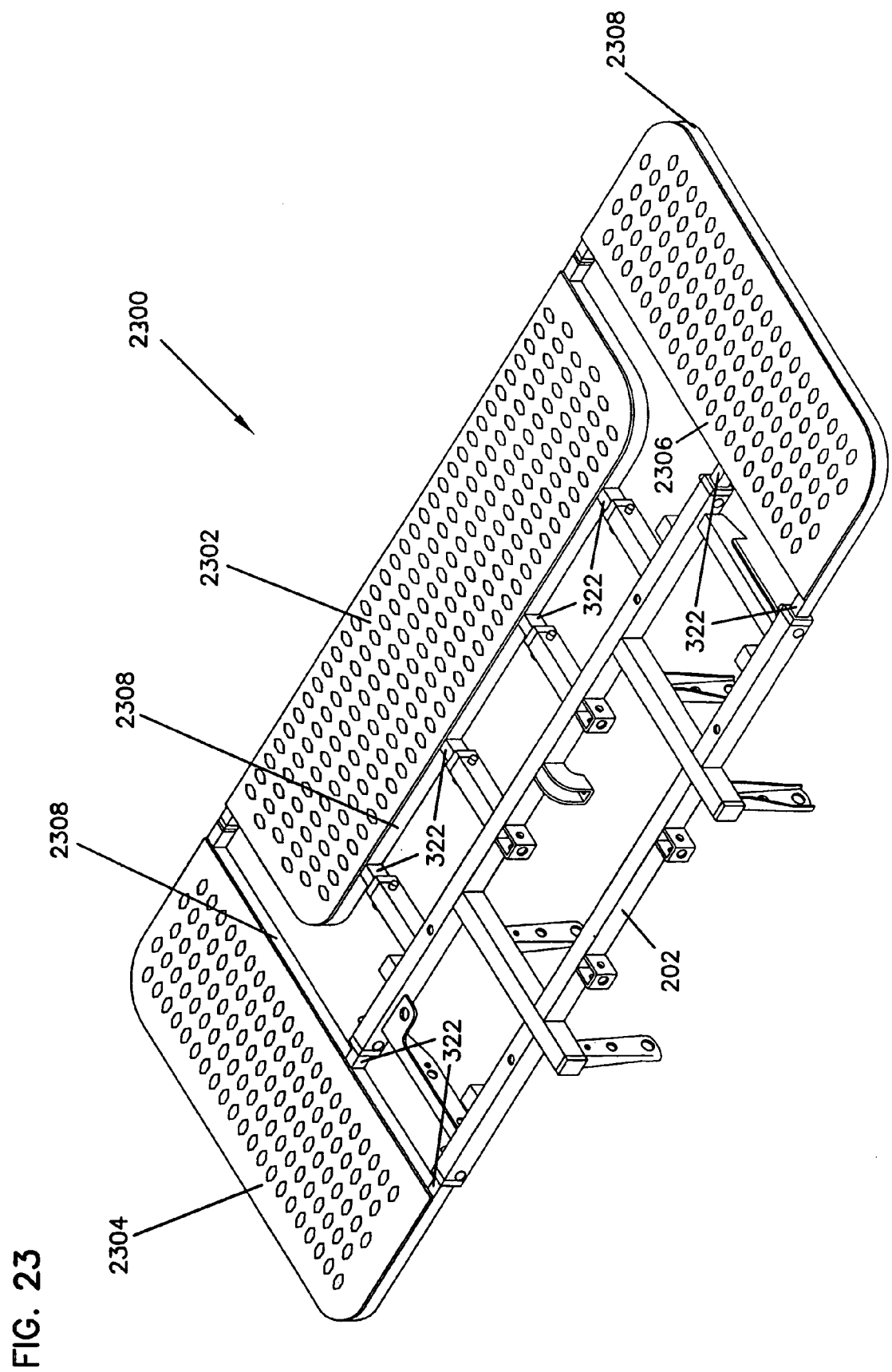

FIG. 23 depicts flatbed extensions 2300 which have been adapted for cooperation with the sectional receiver rack 202. The flatbed extensions 2300 are composed of a middle piece 2302 flanked by two end pieces 2304, 2306. Each of the pieces 2302, 2304, and 2306 are composed of perforated metal fastened to a frame 2308. Perforated metal is desirable because it is flat and smooth. Attached to the frames of the pieces 2302, 2304, and 2306 are a plurality of coupling members 322, which serve to secure the various pieces 2302, 2304, and 2306 to the rack 202. Together, the middle piece 2302 and end pieces 2304, 2306 cooperate to form a continuous surface upon which an object may be placed.

Figure 24:
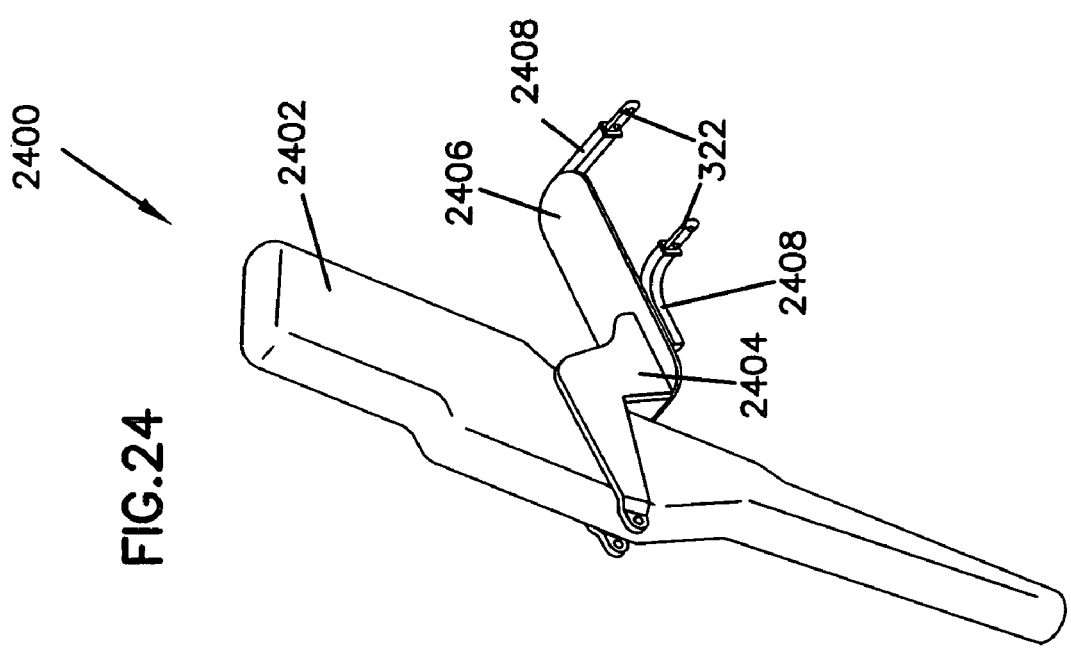

FIG. 24 depicts a gun scabbard mounting unit 2400 that has been adapted for cooperation with the sectional receiver rack 202. As can be seen from FIG. 24, the gun scabbard 2402 is held by an L-shaped bracket piece 2404. The L-shaped bracket piece 2404 is, in turn, mounted to a base 2406. The mounting may be accomplished by way of bolting the base 2406 (which may possess bolt holes to facilitate mounting) to the L-shaped bracket piece 2404. The base 2406 is mounted to a frame 2408, which includes a set of coupling members 322, which serve to secure the base 2406, L-shaped bracket 2404, and gun scabbard 2402 to the rack 202.

Figure 25:
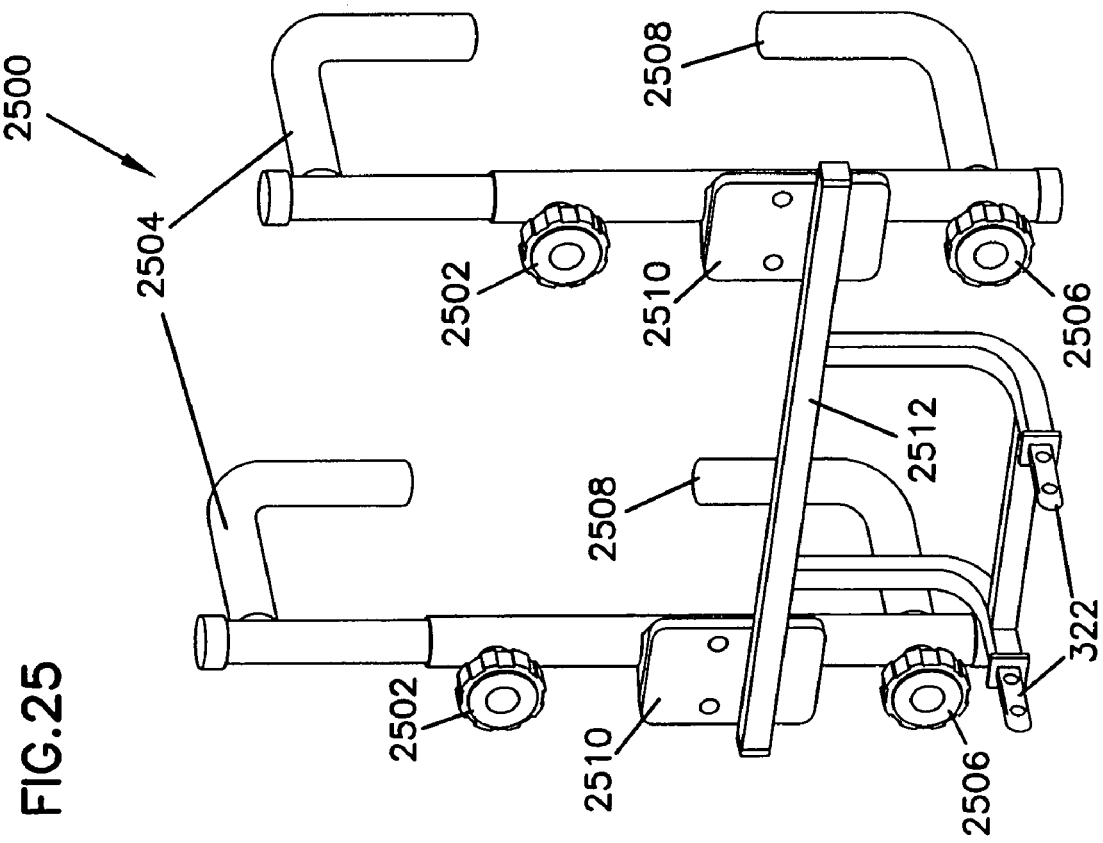

FIG. 25 depicts a gear lock 2500 that that has been adapted for cooperation with the sectional receiver rack 202. The gear lock 2500 design is standard. It includes a first set of gears 2502 that control the vertical orientation of a first set of clamping members 2504. By turning the gears 2502 either clockwise or counterclockwise, the first set of clamping members 2504 may be moved either upwardly or downwardly. A second set of gears 2506 controls the horizontal orientation of a second set of clamping members 2508. By turning the gears 2506 either clockwise or counterclockwise, the second set of clamping members 2508 are moved either inwardly or outwardly. The first and second set of clamping members 2504 and 2508 cooperate to form a channel into which an object, such as a bicycle may be clamped. The gear lock 2500 is fastened (e.g., via bolts) to a pair of bases 2510, which are, in turn, fastened to a frame 2512. The frame 2512 includes a set of coupling members 322, which serve to secure the gear lock 2500 to the rack 202.

Figure 26:
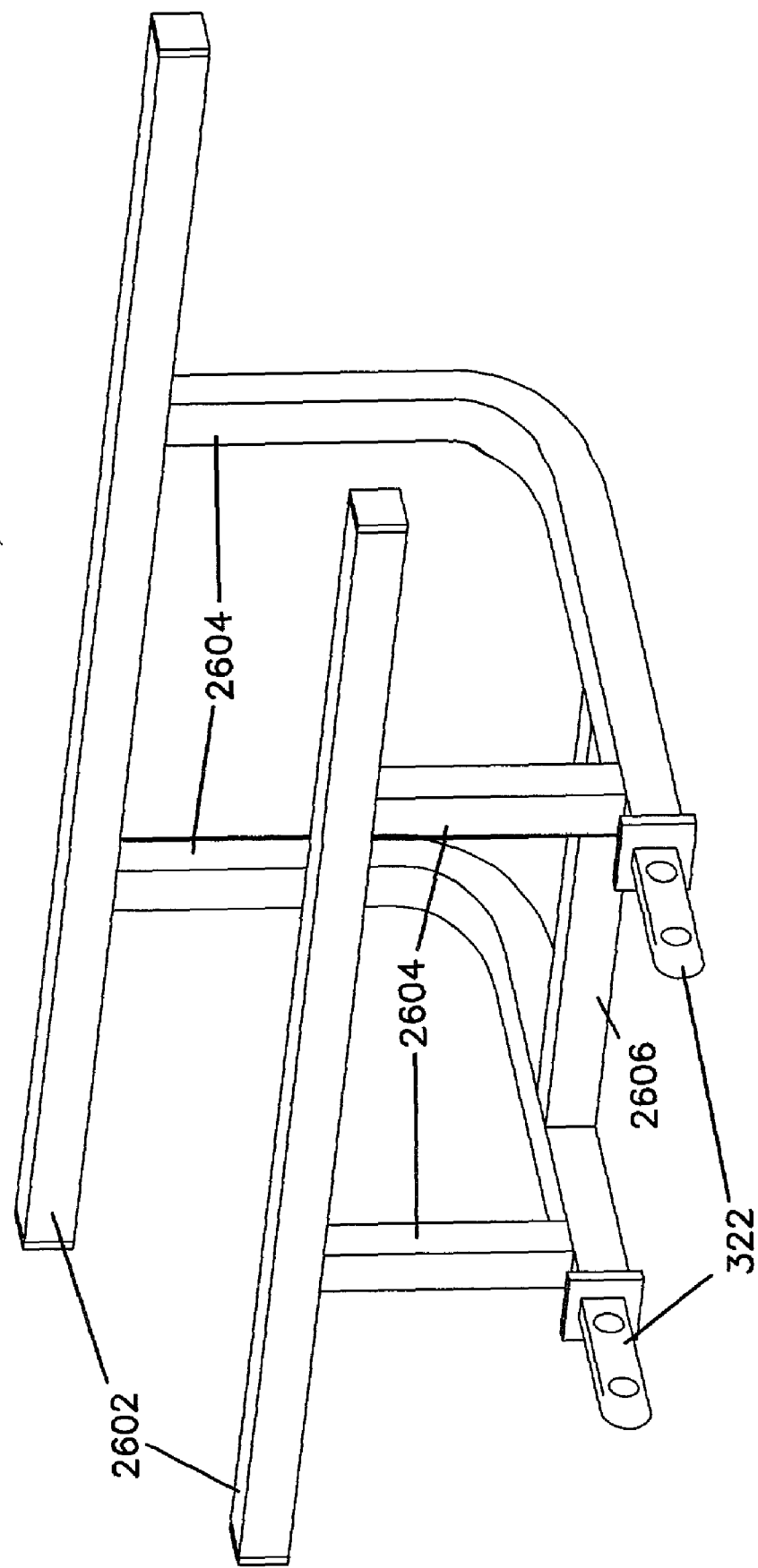

FIG. 26 depicts a gear cradle 2600 that has been adapted for cooperation with the sectional receiver rack 202. The gear cradle 2600 includes a set of substantially parallel restraining members 2602. Each of the substantially parallel restraining members 2602 has a pair of downwardly projecting members 2604 attached thereto. The downwardly projecting members 2604 may be cross-linked by one or more cross-linking members 2606. Together, the substantially parallel members 2602 and the downwardly projecting members 2604 cooperate to form a channel for carrying objects. The downwardly projecting members 2604 are attached to a set of coupling members 322, which serve to secure the gear cradle to the rack 202.

Figure 27:
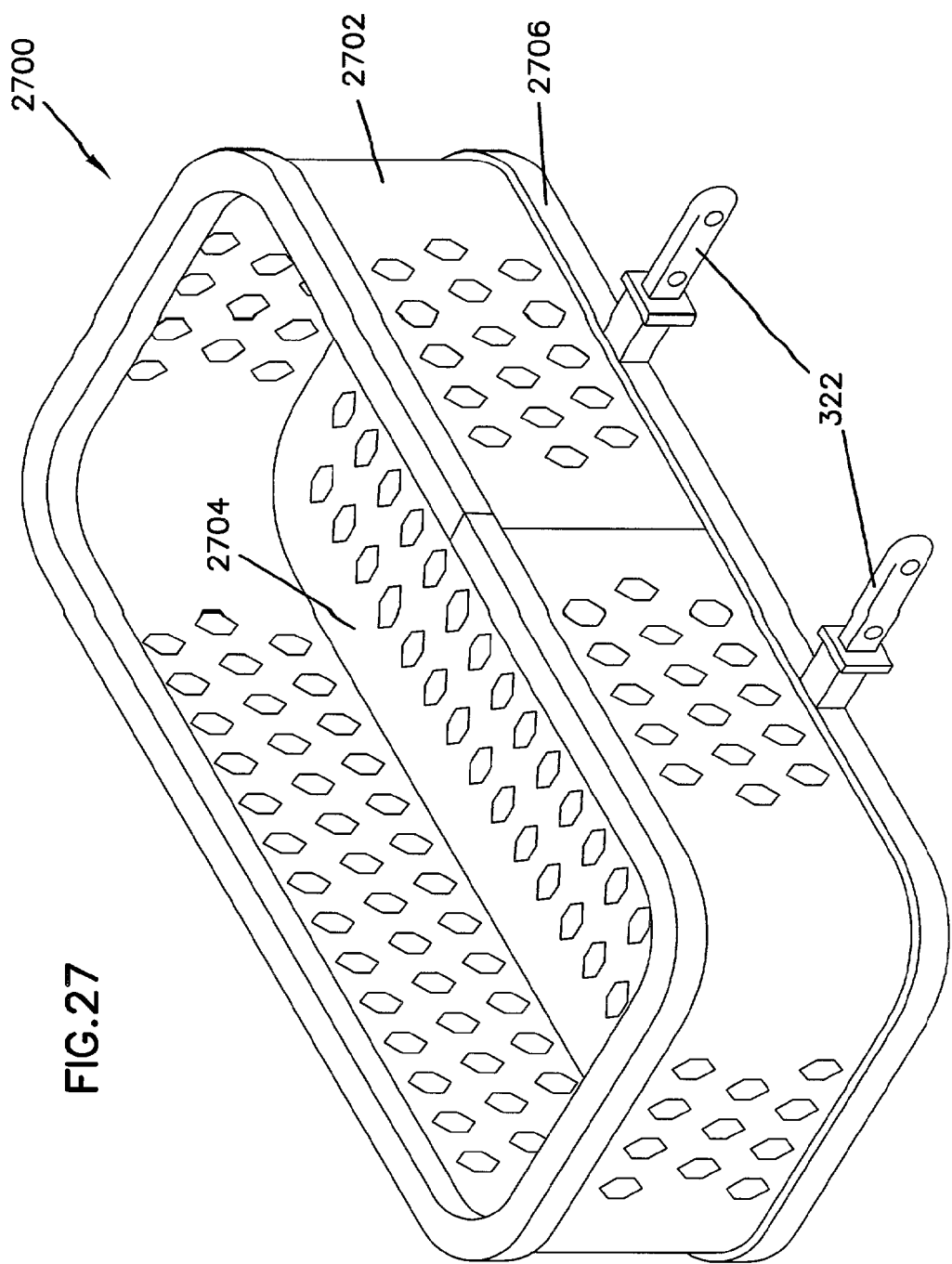

FIG. 27 depicts a fender box 2700 that has been adapted for cooperation with the sectional receiver rack 202. The fender box 2700 includes a set of side walls 2702 attached to a bottom portion 2704. The side walls 2702 and bottom portion 2704 cooperate to form a basket-like volume into which objects may be inserted for carrying the side walls 2702 and bottom portion may be made of perforated metal, which is desirable due to its flatness and smoothness. The bottom portion 2704 is connected to a frame 2706, which includes a set of coupling members 322, which serve to secure the fender box to the rack 202.

Figure 28:
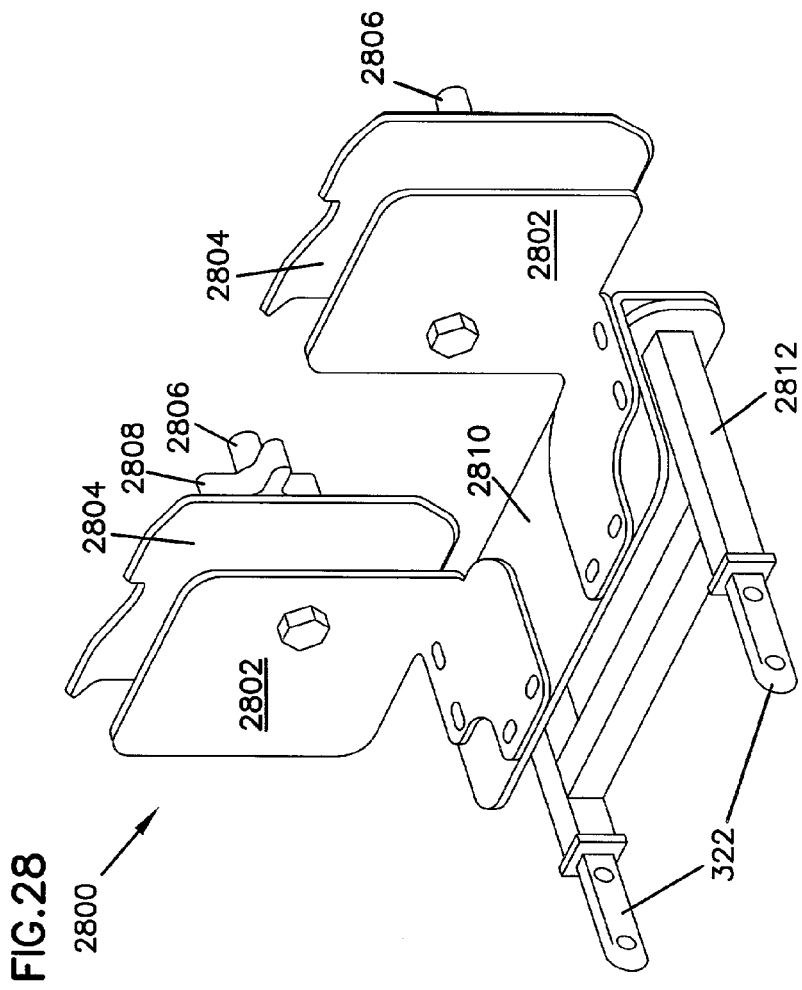

FIG. 28 depicts a tool lock 2800 that has been adapted for cooperation with the sectional receiver rack 202. The tool lock 2800 includes a set of L-shaped clamping members 2802 the vertical portions of which are substantially coplanar. A second clamping member 2804 is associated with each L-shaped member 2802. Each L-shaped clamping member 2802 and its associated clamping member 2804 are connected via a threaded fastener 2806, which is terminated by a wingnut 2808. The wingnut 2808 therefore controls the spacing between each L-shaped member 2802 and its associated clamping member 2804. A tool or other object may be secured between the L-shaped members 2802 and their associated clamping members 2804. The horizontal portion of each L-shaped member 2802 is bolted to a base 2810, which is, in turn, connected to a frame 2812. The frame 2812 includes coupling members 322, which serve to connect the tool lock 2800 to the rack 202.

Figure 29:
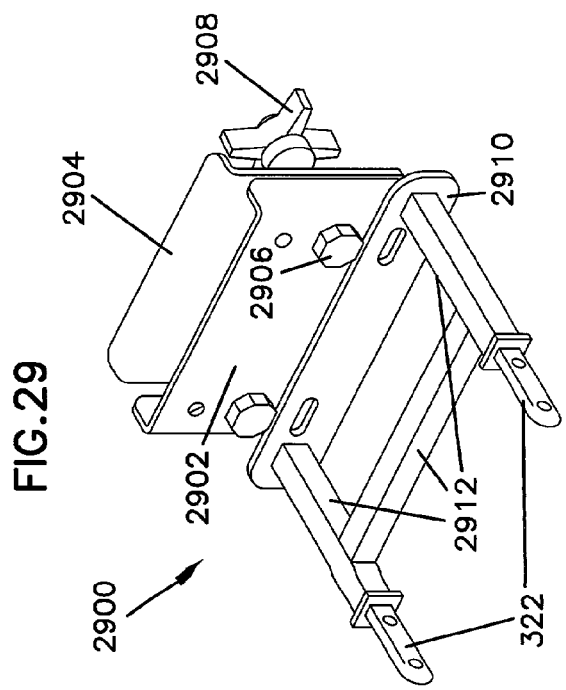

FIG. 29 depicts a saw lock 2900 that has been adapted for cooperation with the sectional receiver rack 202. The saw lock 2900 includes a first plate 2902 that is substantially parallel to a second plate 2904 The first and second plates 2902 and 2904 are connected via threaded fastners 2906. Wingnuts 2908 are disposed on the threaded fasteners 2906. The wingnuts 2908 may be turned either clockwise or counterclockwise to cause the first and second plates 2902 and 2904 to either approach each other or grow more distant. The blade of a saw or chainsaw, for example, may be clamped between the first and second plates 2902 and 2904. The first plate 2902 is attached to a base 2910, which is, in turn, attached to a frame 2912 The frame 2912 includes coupling members 322, which serve to connect the tool lock 2800 to the rack 202.

FIG. 30 depicts a workbase 3000 that has been adapted for cooperation with the sectional receiver rack 202. The workbase includes a base plate 3002 that is attached to a frame 3004 that runs along its periphery. The base plate 3002 provides a solid surface upon which to work. Optionally, the base plate may define a plurality of holes 3006, such as threaded passages, which permit an object (e.g., a vise) to be mounted thereto. The frame 3004 includes coupling members 322, which serve to connect the workbase 3000 to the rack 202.

FIG. 31 depicts a utility bar 3100. The utility bar is connected to two substantially parallel frame pieces 3102, which are, in turn, connected to coupling members 322. The utility bar may be used, for example, to clamp various items upon (e.g., lights, a compass etc.). The coupling members 322 serve to connect the utility bar 3100 to the sectional receiver rack 202.

Figure 32C:
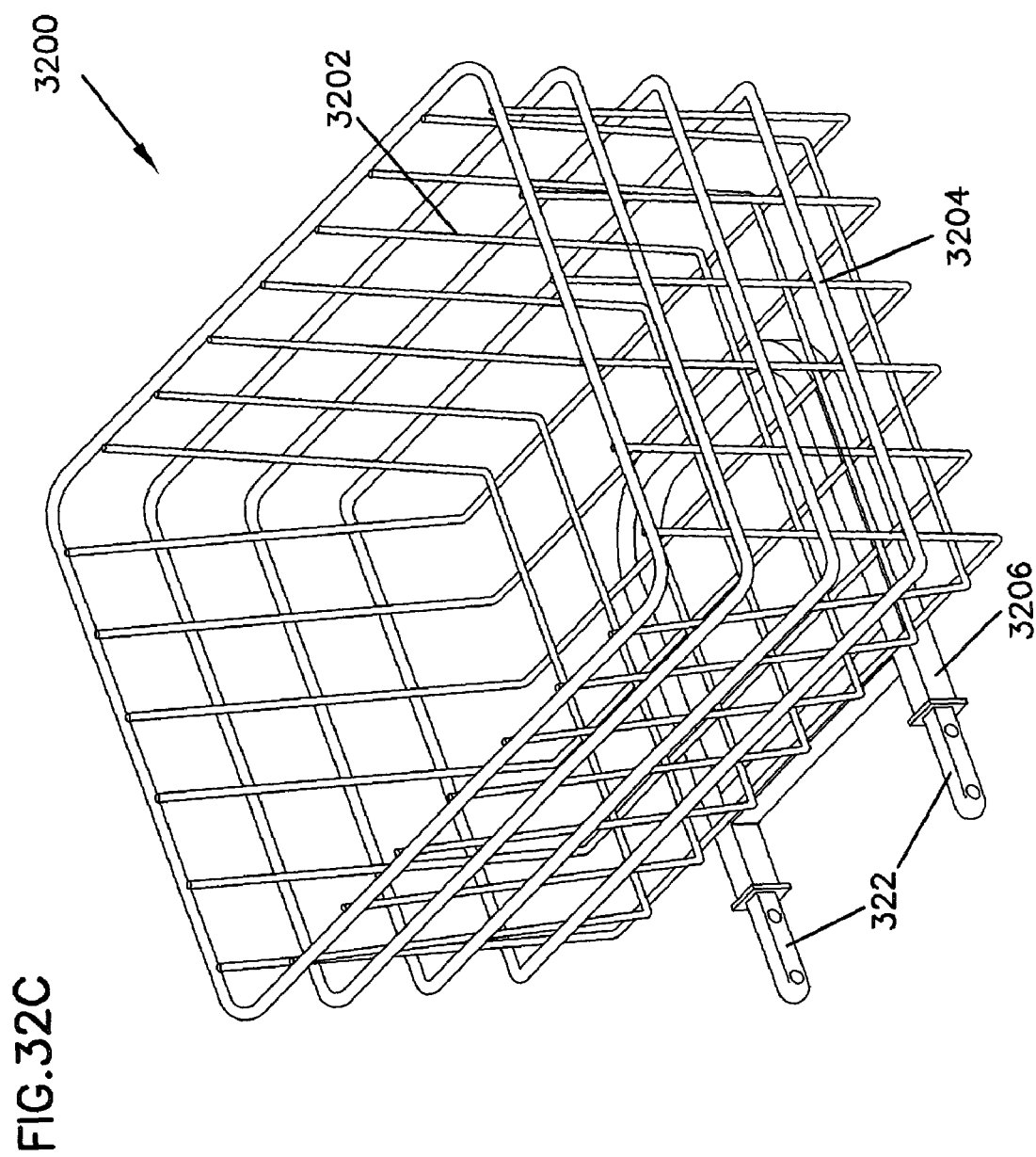

FIGS. 32A, 32B, and 32C depict various embodiments of a carryall 3200 that has been adapted for cooperation with the sectional receiver rack 202. Each of the various embodiments depicted in FIGS. 32A, 32B, and 32C possesses side portions 3202 and a bottom portion 3204. For each embodiment, the side portions 3202 and bottom portion 3204 cooperate to form a partially enclosed basket-like volume into which an object may be inserted for carrying. The bottom portion 3204 is connected to a frame 3206, which includes coupling members 322 that serve to connect the carryall 3200 to the rack 202.

The cargo units depicted in FIGS. 5–11 and 19–32C are exemplary. One skilled in the art understands that other forms of cargo units may be made to possess coupling members 322 that mate with the couplers 318, 320 of the main framework 300. Further, although the various embodiments of cargo units depicted in FIGS. 5–11 and 19–32 are shown as using either a tubular or solid coupling member 322, any embodiment of any cargo unit may make use of either a solid or tubular coupling member 322. Further still, any of the cargo units depicted in FIGS. 5–11 and 19–32C may be mated with either the horizontally disposed couplers 318 and 320 or the vertically oriented couplers 1616.

Figure 12:
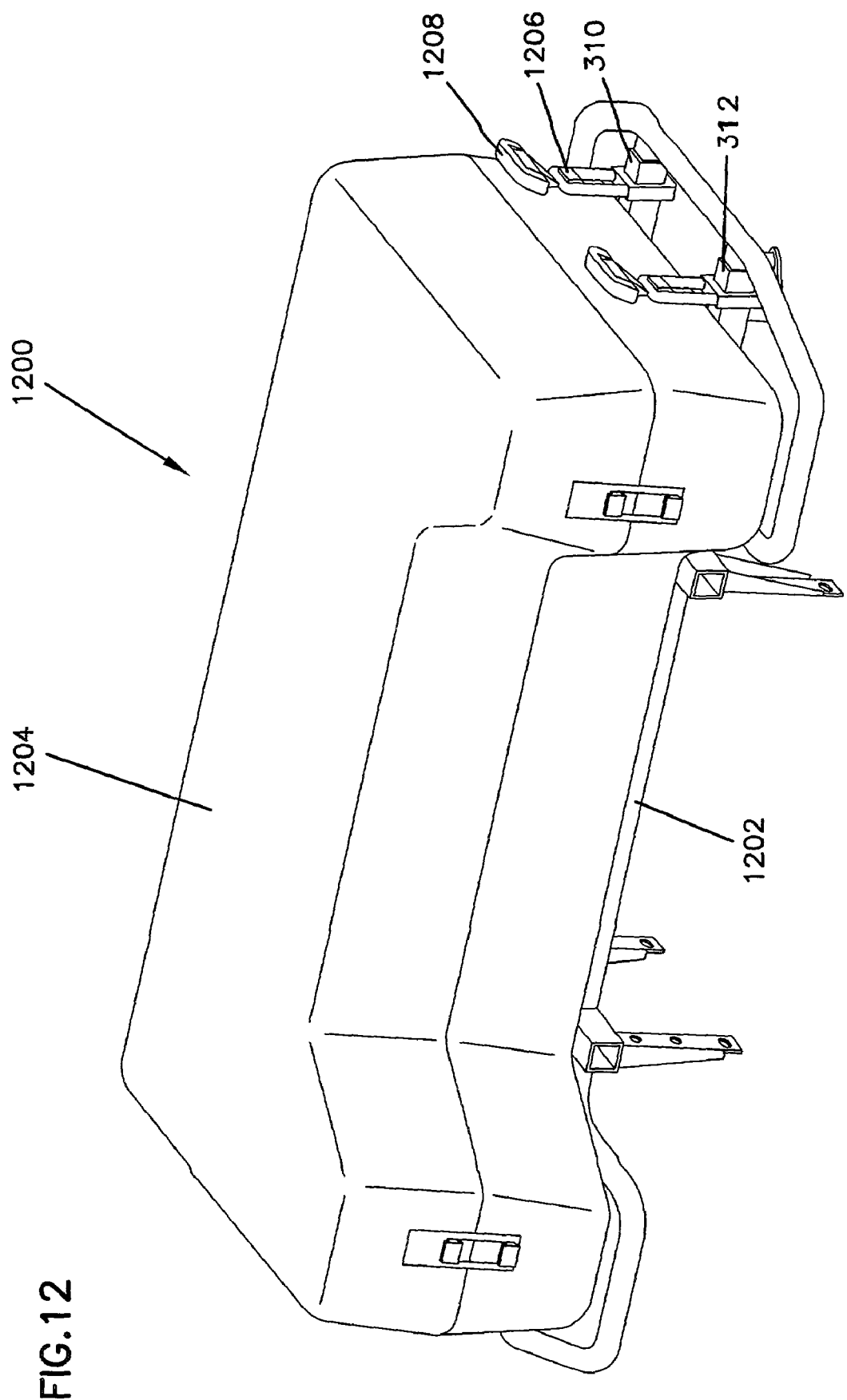
FIG. 12 depicts a cargo unit adapted for fastening to the sectional receiver rack, in accordance with one embodiment of the present invention.

According to another embodiment of the invention, cargo units may be made to mate with the receiver rack 202 by schemes other than attachment of coupling members to the cargo unit. FIG. 12 depicts one such embodiment. A storage box 1200 is depicted in FIG. 12. The storage box 1200 includes a base portion 1202 and a lid portion 1204. The base portion 1202 possesses a plurality of flanges 1206, which serve as anchor points around which releasable fasteners 1208 are hooked. The fasteners 1208 are designed to fit snugly with the parallel, tubular members 310 and 312 and hook around the flanges 1206 thereby securing the storage box 1200 to the receiver rack 202.

Figure 15A:
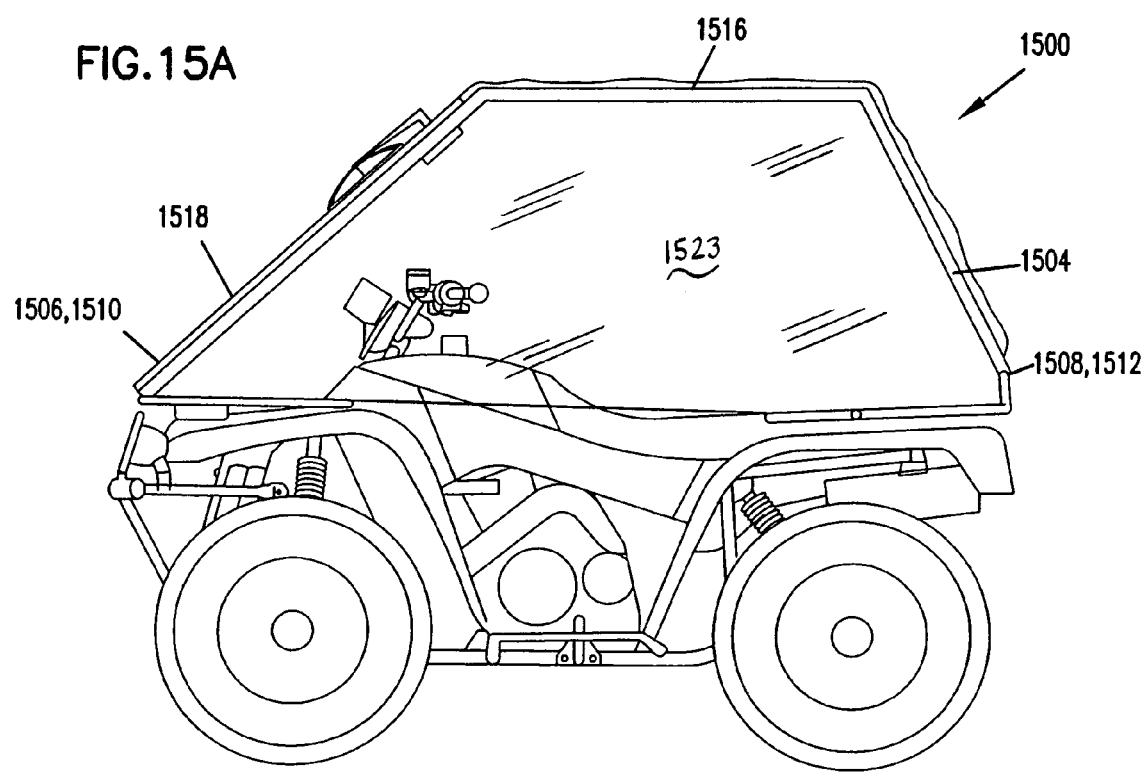
FIG. 15A depicts a side view of a recreational vehicle outfitted with a top unit that is arranged to mate with the sectional receiver unit, in accordance with one embodiment of the present invention.
Figure 15B:
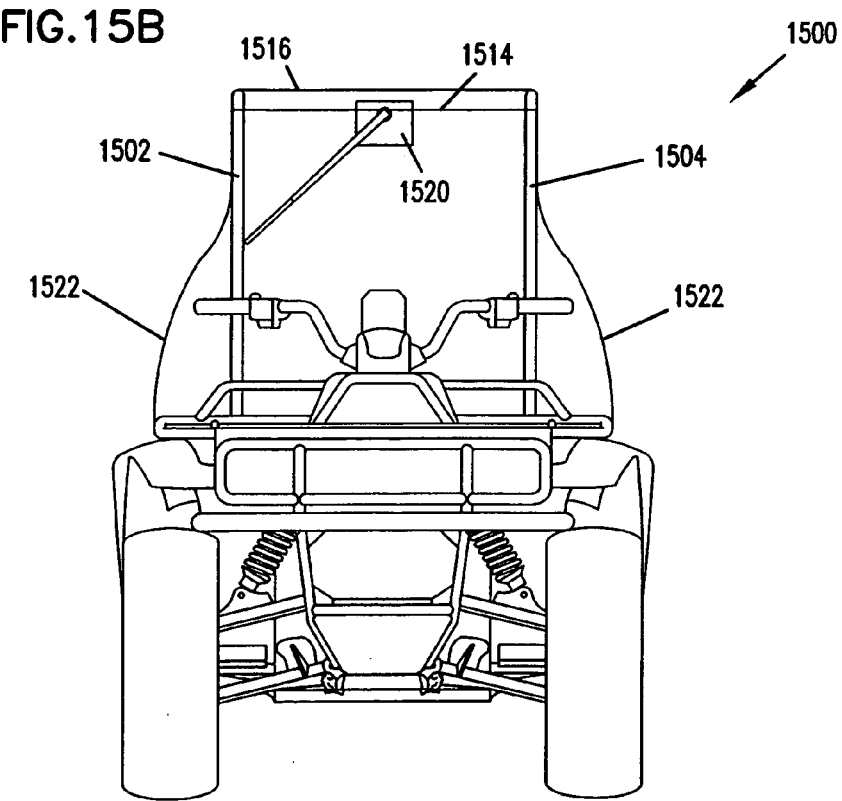
FIG. 15B depicts a side view of a recreational vehicle outfitted with a top unit that is arranged to mate with the sectional receiver unit, in accordance with one embodiment of the present invention.

FIGS. 15A and 15B depict a top unit 1500 that is arranged to mate with the couplers 104 of the main framework 102. The top unit 1500 includes two frame pieces 1502 and 1504, each of which extends from the rear of the ATV to the front of the ATV. A pair of main frameworks 102 are mounted upon mounting surfaces located at the front of the ATV and at the rear of the ATV. The first frame piece 1502 possesses a front coupling member 1506 that mates with a coupler 318 located on the frontally-mounted main framework 102, on its left-hand edge (wherein "left" refers to the direction that would be judged as being "left" from the vantage of a driver of the ATV). On its rear edge, the first frame piece 1502 possesses a rear coupling member 1508 that mates with a coupler 318 located on the rearward-mounted main framework 102, on its left-hand side. On the other side of the ATV (the right-hand side), the second frame piece 1504 possesses a front coupling member 1510 that mates with a coupler 318 located on the frontally-mounted main framework 102, on its right-hand edge. On its rear edge, the second frame piece 1504 possesses a rear coupling member 1512 that mates with a coupler 318 located on the rearward-mounted main framework 102, on its right-hand side.

As can be seen from FIGS. 15A and 15B, each of the frame pieces 1502 and 1504 projects upwardly from the front edge of the ATV, so as to provide comfortable head room for a rider seated in the ATV. It is also dimensioned so as to provide a comfortable amount of space over the cargo area by the rearward main framework 102. Thus, the general shape of each of the two frame pieces 1502 and 1504 is such that each piece connects to a front corner of the ATV, projects upwardly therefrom, runs rearward toward the back of the ATV, and projects downwardly so as to permit a connection to a rear corner of the ATV. The frontal upward projection of reach frame piece 1502, 1504 may be sloped, so as to generally mimic the shape of a front windshield of an automobile. One or more cargo uniting members 1514 may run between the frame pieces 1502, 1504, thereby providing lateral stability to the top unit 1500.

A canvas material (or other similar material) may be stretched so as to span the region between the two frame pieces 1502, 1504, thereby forming a top 1516, which might shield the passenger and cargo space of the ATV from rain or other elements. The canvas top 1516 may be removably fastened to the frame pieces 1502, 1504, such as by snaps or other fastening mechanisms known in the art.

Spanning the region between the frontal upward projection of each frame piece 1502, 1504 may be a transparent plastic material that acts as a windshield 1518. The windshield 1518 may be mounted on one end to a cross-linking member 1514 that runs along the bottom of the windshield 1518 and to another cross-linking member 1514 that runs along the top end of the windshield 1518. The windshield's 1518 sides may be mounted to each respective frame piece 1502 and 1504.

Optionally, the cross-linking member 1514 located along the bottom or top of the windshield 1518 may provide a pivotal anchor point for a windshield wiper unit 1520. The windshield wiper unit 1520 may draw its power from the electrical system of the ATV.

Optionally, windshield extensions 1522 may be coupled to the periphery of the windshield 1518. The windshield extension 1522 extends outwardly so as to protect the hands of the driver of the ATV.

Side curtains 1523 may optionally extend from the top of the frame pieces 1502, 1504 to a set of anchor points located along the forward and rearward edges of each frame piece 1502, 1504 Like the top 1516, the side curtains 1523 may be made of canvas or other similar material. The side curtains 1523, top 1516, and windshield 1518 cooperate to enclose the passenger and cargo space of the ATV.

According to one embodiment, the top 1516, side curtains 1523, and windshield 1518 are each made of a transparent plastic. In some embodiments, the transparent plastic is rigid, while in another embodiment, the transparent plastic material is a flexible sheet-like polymer.

Another embodiment of the invention is directed toward a method of doing business. The cargo units described in the passages corresponding to FIGS. 1 and 5–12 are items that are used in conjunction with ATVs. However, the revenue generated by the sale of those cargo units has heretofore been uncaptured by the manufacturer of the ATV. By producing a receiver rack designed to mate with particular cargo units, the ATV manufacturer is able to capture the revenue from the sale of those products.

Figure 13:
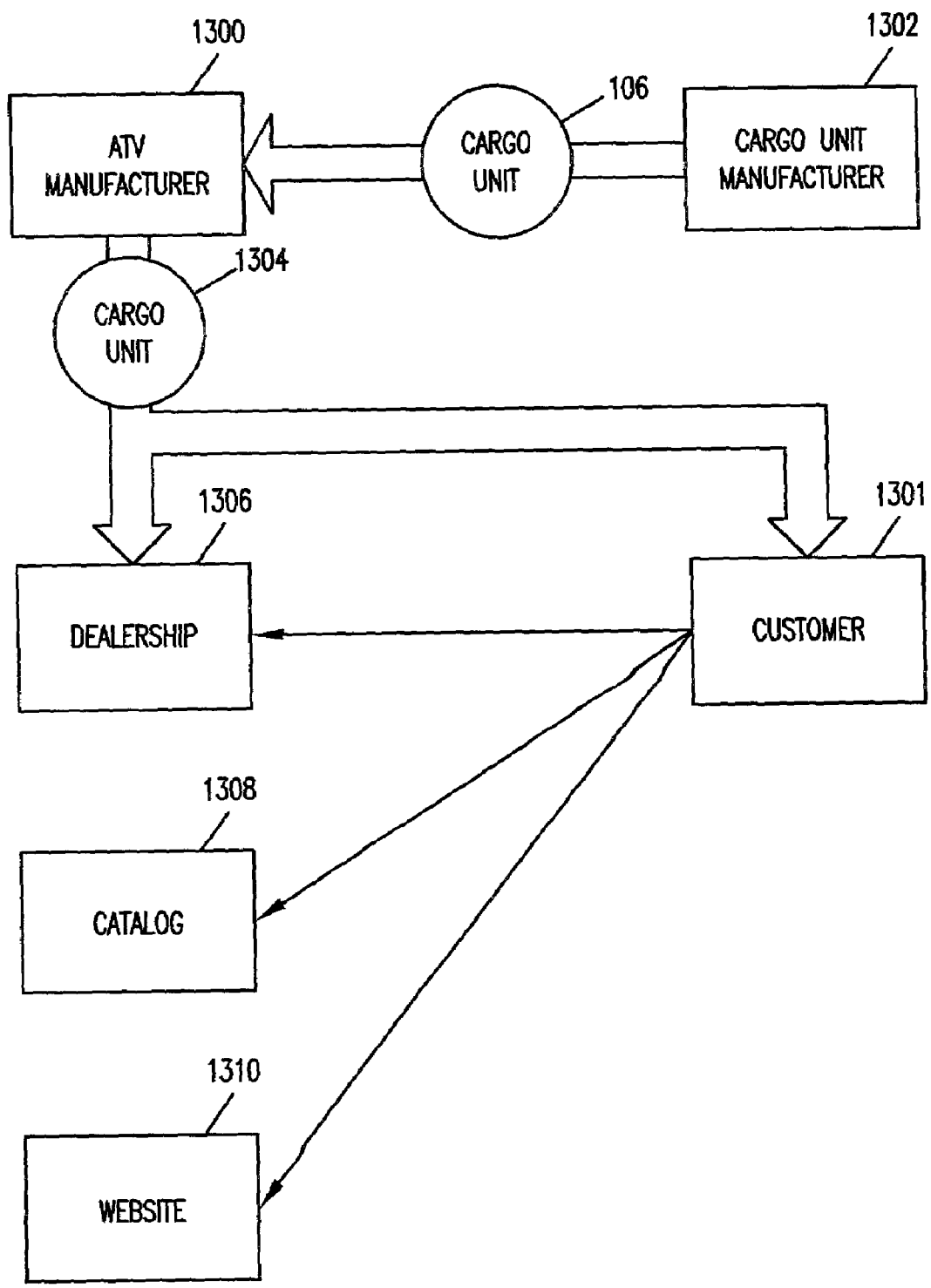
FIG. 13 depicts a business scheme by which a manufacturer of an ATV may capture some of the revenue generated from the sale of the cargo units, in accordance with one embodiment of the present invention.

FIG. 13 depicts a business scheme of by which a manufacturer 1300 of an ATV may capture some of the revenue generated from the sale of the cargo units. As can be seen from FIG. 13, the ATV manufacturer 1300 buys cargo units 106 from a cargo unit manufacturer 1302 The ATV manufacturer 1300 arranges for the cargo units 106 to be fitted with coupling members 322 for mating with the sectional receiver rack 202 (the ATV manufacturer 1300 can also fit the cargo units 106 to mate with the sectional receiver rack 202 in other ways, an example of which is depicted in FIG. 8) The ATV manufacturer 1300 may either perform the fitting operation itself, or may contract with a third party to do so.

The ATV manufacturer 1300 makes the fitted cargo unit 1304 available for sale by any of several means. The cargo unit 1304 may be shipped to an ATV dealership 1306 for presentation to customers 1301 in the same retail setting as the ATVs are sold. Also, the cargo unit may be advertized via a catalog 1308 or via a website 1310 Purchases conducted via a catalog 1308 or via a website 1310 may be transacted via a dealership 1306 or may be transacted directly between the ATV manufacturer 1300 and the customer 1301

By selling the fitted cargo units 1304, the ATV manufacturer 1300 may realize a profit on the entire cargo unit 1304.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the receiver rack may take on other forms that are capable of mating with couplers attached to cargo units. Other forms of cargo units may be retrofitted with coupling members. Numerous other changes may be made which will readily suggest themselves to those skilled in the art and which are encompassed in the spirit of the invention disclosed and as defined in the appended claims.

The invention claimed is:

1. A receiver rack for use with an all-terrain vehicle, the rack comprising:
   a first tubular member dimensioned approximately to span the width of the all-terrain vehicle;
   a second tubular member running approximately parallel to the first tubular member;
   a plurality of tubular, outwardly-projecting members attached to the first and second tubular members;
   a plurality of cross-linking members connecting the first and second tubular members;
   a plurality of mounting flanges attached to the first and second tubular members, for mounting the tubular members to the all-terrain vehicle;
   a first auxiliary piece comprising a framework and a plurality of coupling members projecting therefrom, wherein the coupling members of the first auxiliary piece are dimensioned to fit within the first and second tubular members, the first auxiliary piece being connected to a cargo unit, thereby permitting the cargo unit to be secured to the receiver rack by virtue of coupling the first auxiliary piece to the first and second tubular members; and
   a second auxiliary piece comprising a framework and coupling members projecting therefrom, wherein the coupling members of the second auxiliary piece are dimensioned to fit within the tubular, outwardly-projecting members attached to the first tubular member.

2. The receiver rack of claim 1, wherein:
   the first tubular member defines a passage extending from a surface of the first tubular member to a diametrically opposed surface;
   the second tubular member defines a passage extending from a surface of the second tubular member to a diametrically opposed surface;
   the plurality of coupling members projecting from the first auxiliary piece define passages extending from a surface of the coupling members to a diametrically opposed surface;
   the coupling members projecting from the first auxiliary piece are inserted into the first and second tubular members, such that their respective passages are aligned; and
   restraining pins pass through the aligned passages defined by the tubular members projecting from the first auxiliary piece and the first and second tubular members.

3. The receiver rack of claim 1, wherein:
   at least one of the outwardly-projecting members attached to the first tubular member has a bushing housed therein, and the bushing is dimensioned to permit insertion of one of the tubular members of the second auxiliary piece.

4. The receiver rack of claim 3, wherein:
   the bushing has an outer surface that is ribbed.

5. The receiver rack of claim 3, wherein:
   the bushing has an inner surface with longitudinal ribs running along the inner surface.

6. A sectional receiver rack for use with an all-terrain vehicle, the rack comprising:
   a main framework dimensioned approximately to fit atop an all-terrain vehicle to which the main framework is attached, the main framework being flat and having oppositely positioned first and second sides and a third side running between the first and second sides;
   a plurality of couplers connected to each of the first, second and third sides of the main framework;
   first, second and third auxiliary frame pieces, for attachment to the couplers connected to the first, second and third sides of the main framework; and
   wherein the couplers project outwardly from the main framework and the first and third auxiliary frame pieces secure to the second auxiliary frame piece.

7. The sectional receiver rack of claim 6, further comprising:
   a plurality of mounting flanges attached to the main framework, for mounting the main framework to the all-terrain; and
   wherein the first, second, and third auxiliary frame pieces and the main frame work define a substantially planar support surface.

8. The sectional receiver rack of claim 6, wherein:
   the first, second, and third auxiliary frame pieces comprise tubular members;
   the couplers connected to the first, second, and third sides of the main framework are dimensioned to fit within the tubular members of the first, second, and third auxiliary frame pieces, thereby mating the main framework with the first, second and, third auxiliary frame pieces.

9. The sectional receiver rack of claim 6, wherein:
   the first, second, and third auxiliary frame pieces comprise coupling members;
   the coupling members of the first, second, and third auxiliary frame pieces are dimensioned to fit within the couplers connected to the first, second, and third sides of the main framework, thereby mating the main framework with the first, second and, third auxiliary frame pieces.

10. A sectional receiver rack comprising:
a plurality of transverse members defining a surface having a perimeter;
a first and second coupler oriented along a direction substantially parallel to the surface defined by the transverse members;
a third and fourth coupler oriented along a direction substantially perpendicular to the surface defined by the transverse members and positioned within the surface spaced inward from the perimeter thereof;
wherein, a cargo unit including a coupling member may be secured to the sectional receiver rack by virtue of mating the coupling member to one of the first, second, third, or fourth couplers.

11. The sectional receiver rack of claim 10, wherein the first and second couplers are oriented with respect to each other in a manner identical to that of the third and fourth couplers.

12. An all-terrain vehicle comprising:
a first mounting surface located in a position selected from the group consisting of a region of an upper surface of the vehicle above the vehicle's front tires and a region of an upper surface of the vehicle above the vehicle's rear tires;
a sectional receiver rack for carrying a cargo unit, the sectional receiver rack being mounted upon the mounting surface and comprising
a first main receiver rack frame having a planar portion comprising a plurality of support members, the upper surfaces of the support members being substantially coplanar, and comprising a coupler positioned within the planar portion spaced inward from a perimeter thereof;
a cargo unit comprising a coupling member that cooperates with the coupler to permit the cargo unit to be secured to the first main receiver rack frame.

13. The all-terrain vehicle of claim 12, wherein the cargo unit rests on the support members and occupies a substantial amount of the planar portion.

14. The all-terrain vehicle of claim 13, wherein the coupler is oriented along a direction substantially perpendicular to a plane defined by the upper surfaces of the support members.

15. The all-terrain vehicle of claim 14, wherein the first main receiver rack further comprises a receiver and an auxiliary frame piece, the auxiliary frame piece selectively securable within the receiver and having a portion thereof substantially coplanar with the support members to form a continuous bearing surface.

16. The all-terrain vehicle of claim 15, wherein the receiver comprises a tubular, outwardly-projecting member, defining an orifice into which portions of the auxiliary frame piece may be inserted, thereby connecting the auxiliary frame piece to the main receiver rack frame.

17. The all-terrain vehicle of claim 16, further comprising a plurality of mounting flanges attached to the main receiver rack for mounting the main framework to the all-terrain vehicle.

18. The all-terrain vehicle of claim 17, wherein the cargo unit is a toolbox.

19. A method for using a sectional receiver rack, the method comprising:
providing a first mounting surface located in a position selected from the group consisting of a region of an upper surface of a vehicle above a vehicle's front tires and a region of an upper surface of the vehicle above the vehicle's rear tires;
providing a sectional receiver rack for carrying a cargo unit comprising
a first main receiver rack frame having a planar portion comprising a plurality of support members, the upper surfaces of the support members being substantially coplanar,
a receiver secured to the first main receiver rack frame, and
an auxiliary frame piece, the auxiliary frame piece selectively securable within the receiver having a portion thereof substantially coplanar with the support members to form a continuous bearing surface;
mounting the sectional receiver rack to the mounting surface;
providing a functional unit having a use other than as a support structure;
securing the auxiliary frame piece within the receiver;
removing the auxiliary frame piece; and
securing the functional unit to the receiver.

20. The method of claim 19, further comprising:
providing at least one coupler secured to the first main receiver rack within the planar portion; and
providing at least one cargo unit; and
securing the cargo unit to the coupler.

21. The method of claim 20, wherein securing the cargo unit to the coupler further comprises resting the cargo unit on the support members.

22. The method of claim 21, further comprising:
providing a coupling member;
securing the coupling member to the cargo unit; and
securing the coupling member to the coupler after having secured the coupling member to the cargo unit.

23. An all-terrain vehicle comprising:
a first mounting surface located in a position selected from the group consisting of a region of an upper surface of the vehicle above the vehicle's front tires and a region of an upper surface of the vehicle above the vehicle's rear tires;
a sectional receiver rack for carrying a cargo unit, the sectional receiver rack being mounted upon the mounting surface and comprising
a first main receiver rack frame having a planar portion comprising a plurality of support members, the upper surfaces of the support members being substantially coplanar, and comprising a coupler positioned within the planar portion;
a bushing positioned within the coupler; and
a cargo unit comprising a coupling member that cooperates with the coupler to permit the cargo unit to be secured to the first main receiver rack frame having the bushing interposed between the coupling member and the coupler.

24. The receiver rack of claim 23, wherein:
at least one of the outwardly-projecting members attached to the first tubular member has a bushing housed therein, and the bushing is dimensioned to permit insertion of one of the tubular members of the second auxiliary piece.

25. The receiver rack of claim 24, wherein:
the bushing has an outer surface that is ribbed and is formed of a resilient polymeric material.

26. The receiver rack of claim 25, wherein:
the bushing has an inner surface with longitudinal ribs running along the inner surface.

* * * * *